United States Patent
Ito et al.

[15] 3,646,835
[45] Mar. 7, 1972

[54] SHIFT CONTROL SYSTEM FOR VEHICLE AUTOMATIC TRANSMISSION

[72] Inventors: Shin Ito; Seitoku Kubo; Takakazu Mori, all of Toyota, Japan

[73] Assignee: Toyota Jidosha Kogyo Kabushiki Kaisha, Toyota-shi, Japan

[22] Filed: May 8, 1970

[21] Appl. No.: 35,787

[30] Foreign Application Priority Data
Oct. 18, 1969  Japan..................................44/83412

[52] U.S. Cl..................................74/860, 74/866, 74/869
[51] Int. Cl..............................................B60k 21/08
[58] Field of Search....................................74/859, 860, 866

[56] References Cited

UNITED STATES PATENTS

| | | | |
|---|---|---|---|
| 2,771,788 | 11/1956 | Frick et al. | 74/860 |
| 2,875,635 | 3/1959 | Fleck et al. | 74/860 |
| 3,165,940 | 1/1965 | Grau | 74/859 X |
| 3,335,830 | 8/1967 | De Castelet | 74/859 X |
| 3,433,101 | 3/1969 | Scholl et al. | 74/866 |

*Primary Examiner*—Arthur T. McKeon
*Attorney*—Cushman, Darby & Cushman

[57] ABSTRACT

A shift control system for a vehicle automatic transmission including a transmission gear assembly and gear engaging means. The shift control system comprises both electrical and hydraulic controls and associated shift lever means, whereby the gear changing operation of the transmission is automatically controlled by the electrical control system according to the driving conditions thus providing a highly variable ratio transmission, while provision is made for the semiautomatic control of the transmission by means of the hydraulic circuit. The important features of both automatic and semiautomatic transmissions are thus embodied in one system.

17 Claims, 31 Drawing Figures

INVENTORS
SHIN ITO
SEITOKU KUBO
TAKAKAZU MORI

BY Cushman, Darby & Cushman
ATTORNEYS

PATENTED MAR 7 1972
3,646,835
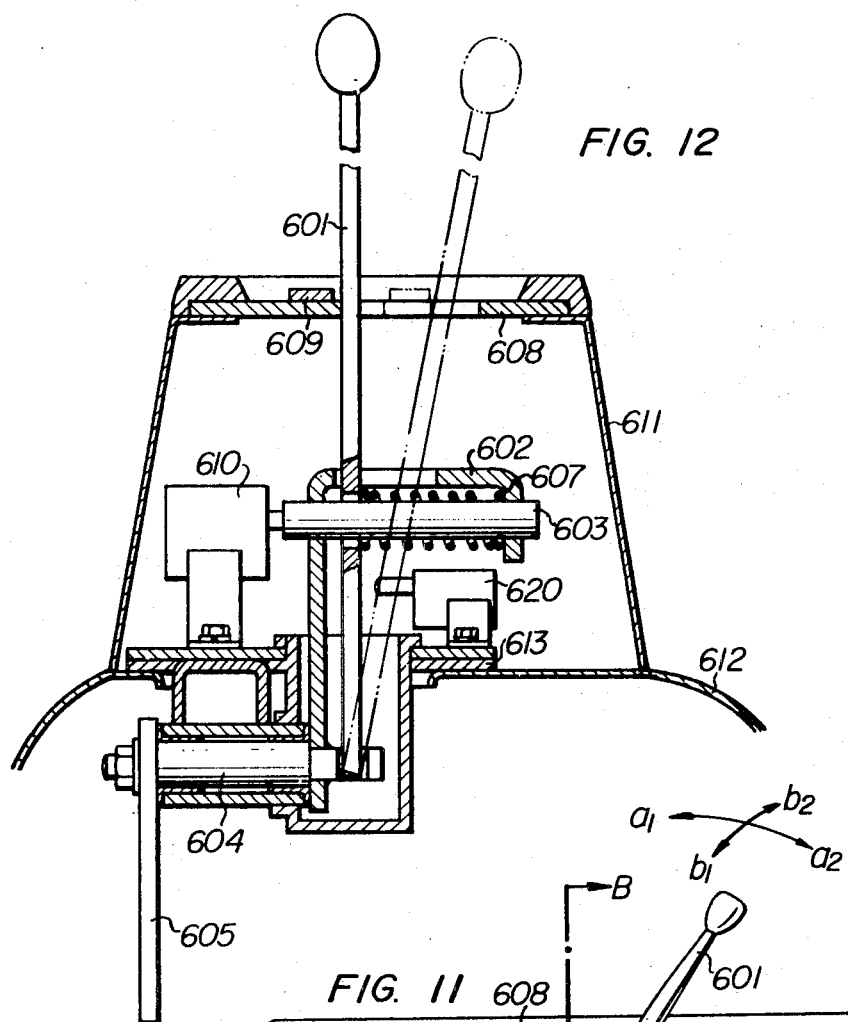
FIG. 12
FIG. 11
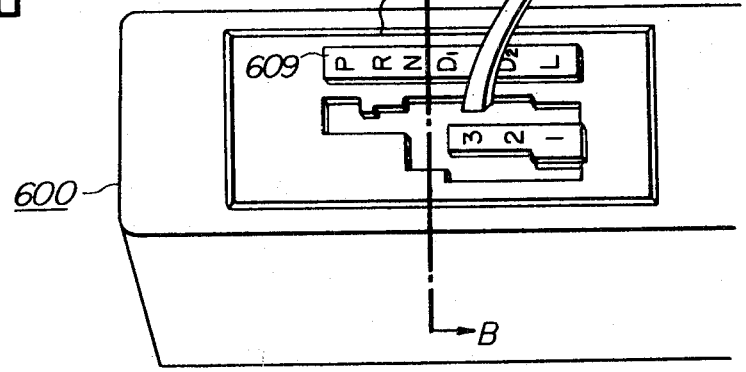
INVENTORS
SHIN ITO
SEITOKU KURO
TAKAKAZU MOR
BY *Cushman, Darby & Cushman*
ATTORNEYS

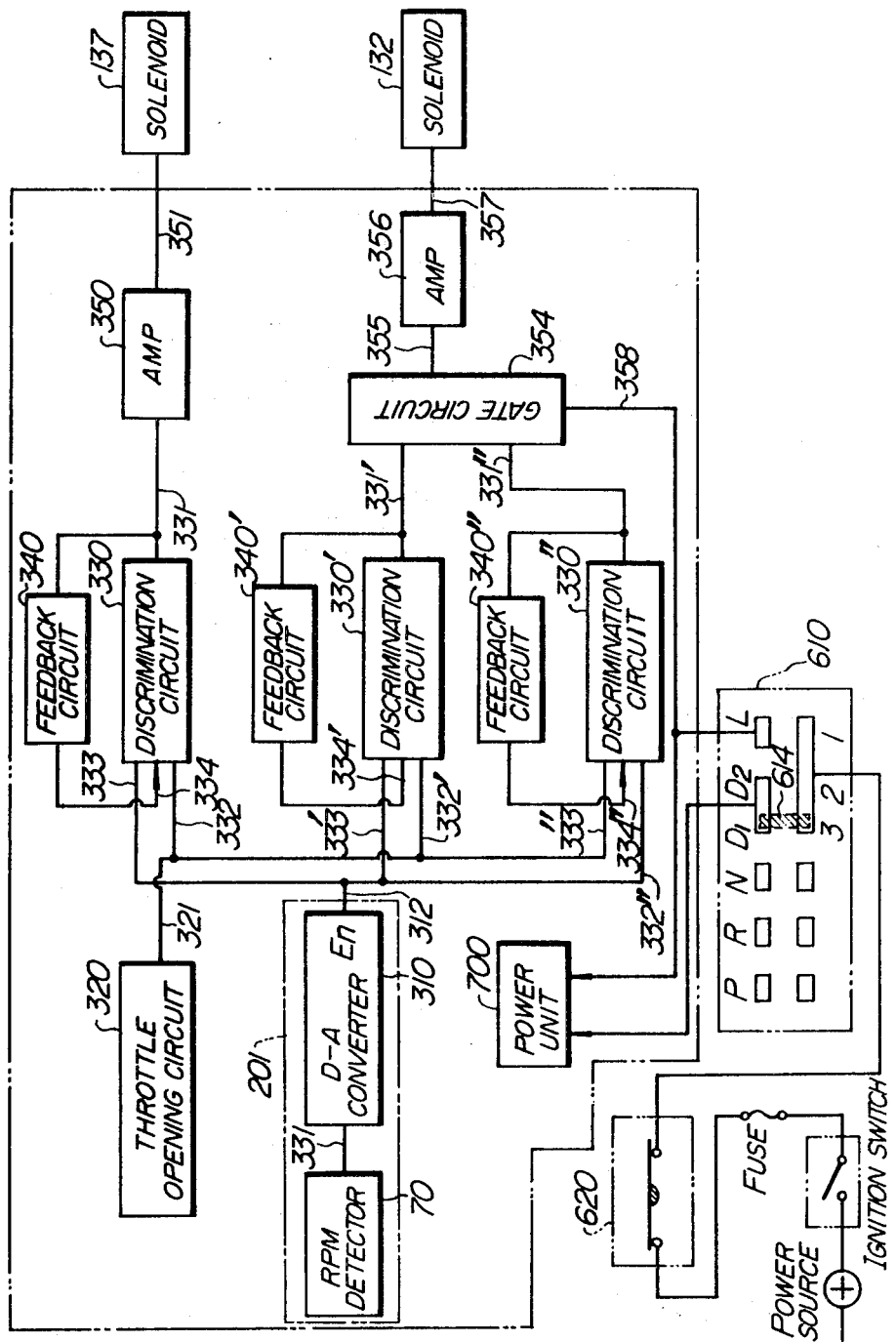

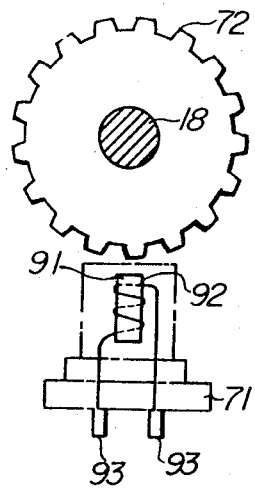
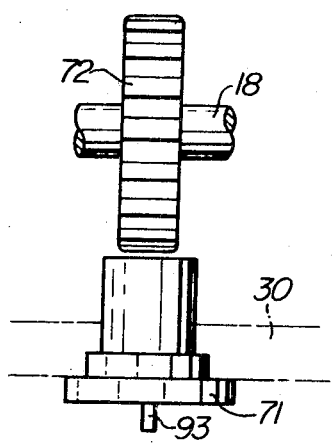
FIG. 14a   FIG. 14b
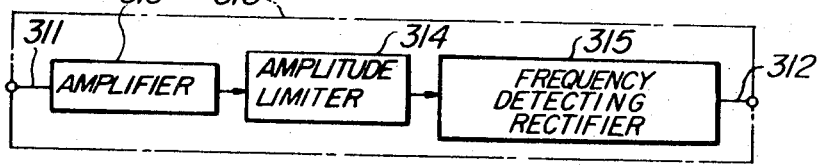
FIG. 15
FIG. 16a
FIG. 16b
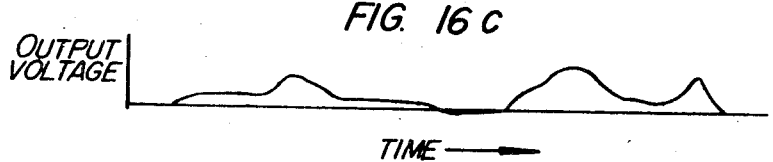
FIG. 16c

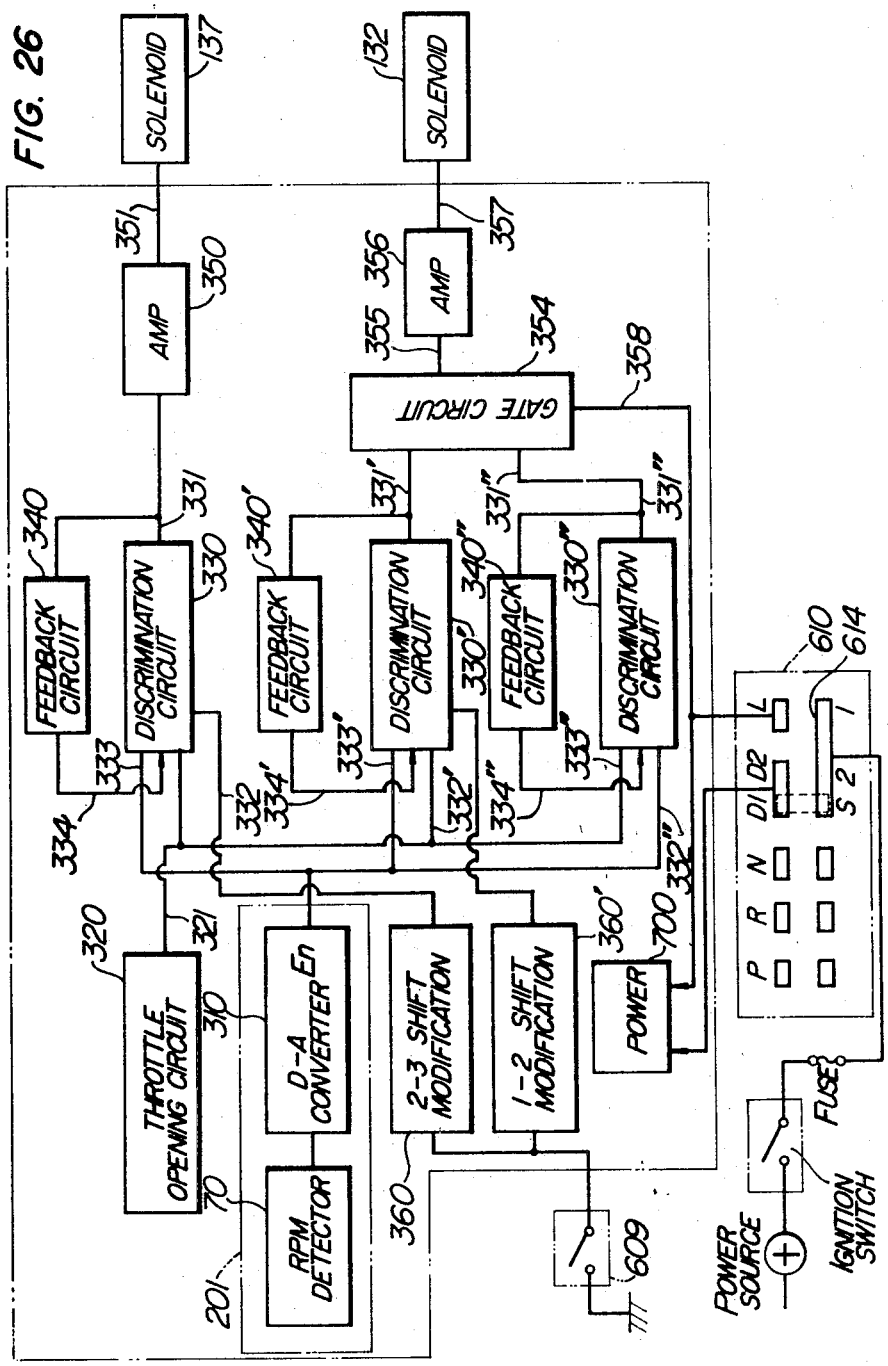

SHIFT CONTROL SYSTEM FOR VEHICLE AUTOMATIC TRANSMISSION

BACKGROUND OF THE INVENTION

1. Field of the Invention

The present invention relates generally to transmission systems and it has a particular relation to a shift control system which combines electrical and hydraulic controls.

2. Description of the Prior Art

In those automatic transmission for vehicles which have hitherto been used generally, all the complicated control operations including shift control were effected through hydraulic controls. Thus, with these hitherto available automatic transmission, it was not an easy matter to enable the shift control to perform more sophisticated functions, not to convey the driver's will to the shift control system. Another drawback was the difficulty of exactly controlling the shift points and thus, in order to effect variations in the setting of shift conditions (particularly, automatic shift conditions), an extremely complex and bulky system was needed.

SUMMARY OF THE INVENTION

To solve these difficulties, it is the object of the present invention contemplates to electrically effect shift controls. At the same time a shift lever installed in the driver's compartment is provided with multiple series, such as two series of operating positions with each of said two series having its own shifting conditions. Other improvements in the electrical and hydraulic control systems are further effected.

According to an embodiment of the present invention, a shift lever is provided with an H-shaped shifting slotted gate which provides for the two series of the shift-lever positions, one of the two series giving the ranges for an automatic transmission which operates in the same manner as the conventional automatic transmissions, while the other series of positions being provided for the semiautomatic shift ranges so that shift control can be effected independently of the electrical system. This enables the driver to drive the vehicle at any desired speed ratio (that will suit the driving conditions) by moving the shift lever. Since these semiautomatic shift ranges are controllable independent of the electrical system, they are completely free from any effects due to the occurrence of a fault in the electrical system. Moreover, availability of both the full-automatic and semi-automatic operations also enables the driver to simultaneously either change gears or use the automatic transmission.

In another embodiment of the present invention, a shift lever is also adapted to work in an H-shaped two-slots shifting gate with one of the slots providing the proper automatic shift points to suit the normal driving conditions. In other words, there are provided an extended high gear range and a limited low gear range. This permits more economical driving and also quieter driving at lower engine speeds. In contrast to this, the other series of shift-lever positions provides an extended low gear range and a limited high gear range for sporty driving and driving in hilly country. In this manner, the present invention is capable of providing various settings of shift points thereby attaining a greater efficiency than is possible in the conventional automatic transmissions.

These objects are achieved by providing in an automatic transmission for vehicle including a transmission gear assembly and engaging means for effecting various gear changing engagements of said transmission gear assembly, a shift control system for a vehicle automatic transmission system comprising shifting actuation means for actuating said engaging means, signal generator means for producing electrical signals representative of the driving conditions of the vehicle, circuit means for acting upon on the signals produced by said signal generator means to determine shift condition (operating conditions) for actuating said shifting actuation means, shift condition modification means for changing said shift condition, and shift lever means having a plural series of gear shifting positions for actuating said shifting actuation means, whereby when said shift lever is transferred from one of said plural series of gear shifting positions to the other series said shift condition modification means is actuated to change said established shift condition.

Another object of the present invention is to provide a shift control system for a vehicle automatic transmission including a transmission gear assembly and engaging means for effecting various gear changing engagements of said transmission gear arrangement, said shift control system comprising shifting actuation means for actuating said engaging means, signal generator means for producing electrical signals representative of the driving conditions of the vehicle, circuit means for acting upon the signals produced by said signal generator means to determine shift condition (operating conditions) for actuating said shifting actuation means, a first electrical circuit for receiving the output signal from said shift condition to effect an automatic shifting action, a second electrical circuit adapted to cut off the output signal from said shift condition thus effecting a semiautomatic shifting action, and shift lever means having two series of gear shifting positions for actuating said shifting actuation means, wherein one of said two series of gear shifting position is associated with said first electrical circuit, and the other series is associated with said second electrical circuit, whereby selection of the gear shifting columns of said shift lever means changes the shift condition for an automatic shifting action or semiautomatic shifting action.

A still further object of the present invention is to provide a shift control system for a vehicle automatic transmission including a transmission gear assembly and engaging means for effecting various gear shifting engagements of said transmission gear assembly, said shift control system comprising shifting actuation means for actuating said engaging means, signal generator means for producing electrical signals representative of the driving conditions of the vehicle, circuit means for operating on the signals produced by said signal generator means to determine the shift conditions (operating conditions) for actuating said shifting actuation means, a shift point modification circuit, first shift point establishing means for applying the signal from said shift point modification circuit to said shift condition establishing operational circuit to establish the shift point, second shift point establishing means for cutting off the signal from said shift point modification circuit to said shift condition establishing operational circuit to establish the shift point, and shift lever means having two series of gear shifting positions for actuating said shifting actuation means, wherein one of said two series of gear shifting positions is associated with said first shift point establishing means, and the other series is associated with said second shift point establishing means, whereby selection of the gear shifting columns of said shift lever means changes the shift point for the automatic shifting action.

Other objects of the present invention will be apparent from the following descriptions of embodiments of the invention taken in conjunction with the accompanying drawings.

BRIEF DESCRIPTION OF THE DRAWINGS

FIG. 11 is a perspective view of a shift lever used with the system of the present invention.

FIG. 12 is a sectional view taken on the line B—B of FIG. 11 showing the internal structure of the shift lever of FIG. 11.

FIG. 13 is a block diagram showing a construction of a shift signal control system incorporated in an embodiment of the present invention.

FIGS. 14a and 14b are schematic diagrams showing the structure of a r.p.m. detector used with the shift signal control system of FIG. 13.

FIG. 15 is a block diagram showing the construction of a D–A converting circuit used with the said shift signal control system.

FIGS. 16a, 16b and 16c are explanatory diagrams showing the operating voltages of the D–A converting circuit of FIG. 15.

FIG. 26 is a block diagram showing the construction of a shift signal control system used with another embodiment of the present invention.

DESCRIPTION OF THE PREFERRED EMBODIMENTS

Figure 1:
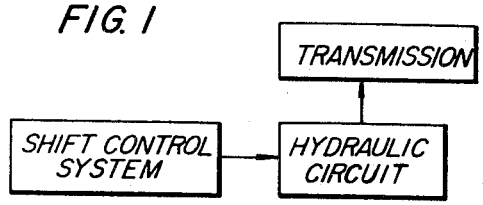
FIG. 1 is a block diagram of an automatic transmission incorporating the shift control system of the present invention.

Referring now to FIG. 1, the principal components of the automatic transmission incorporating the present invention are shown in the form of blocks, and these component parts are broadly divided into the shift control system consisting of a power source, shift lever means, a shifting operational circuit etc., the hydraulic actuation circuit including shift valves which receive signals from the shift control system to change oil circuits and the oil pressure source for operating the friction engaging means, and the transmission gear assembly including the shift gear engagement means, frictional engagement means, etc. The components of the automatic transmission will now be explained in detail.

TRANSMISSION STRUCTURE

Figure 2:
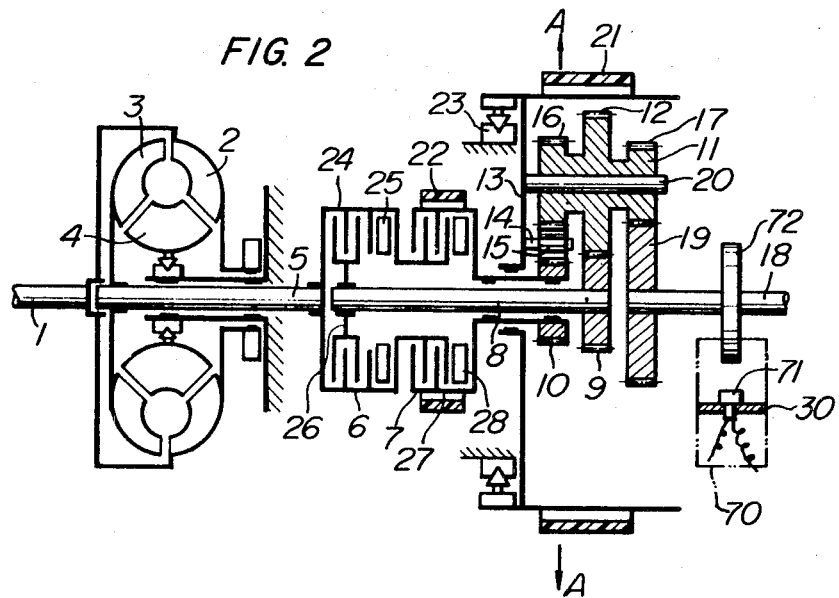
FIG. 2 is a schematic view showing by way of an example the principle of a transmission gear assembly used with the system of the present invention.

As an embodiment of the transmission, a torque converter automatic transmission having three forward speeds and one reverse speed will be discussed below as a typical example. FIG. 2 is a schematic diagram showing a hydraulic automatic transmission providing three forward speeds and one reverse speed.

In the figure, a pump turbine 2 is directly connected to a crankshaft 1 of the engine so that the engine torque is transmitted by the pump turbine 2 to a turbine wheel 3 through the medium of oil and the oil is guided by a stator 4 to reenter into the pump turbine 2. Repetition of this process of oil flow continuously transmits the torque to a turbine shaft 5 0 The transmitted torque of the turbine is then carried from the turbine shaft 5 to a transmission gear assembly arranged at the rear of the torque converter unit. As is well known, multiple disk clutch means 6 and 7 and brake band means 21 and 22 which are automatically controlled by means of the required servo oil pressures, in combination with the planetary transmission gear assembly, provide a transmission system which gives three forward speeds and one reverse speed.

The construction of the transmission gear assembly disposed to the rear of the torque converter will now be explained. The turbine shaft 5 which acts as an input shaft of the planetary gear assembly is integrally splined to a drum 24. Disposed within the drum 24 is the multiple plate clutch 6 (hereinafter referred to as a front clutch) which is turned on or off by a hydraulically actuated piston 25 through a back spring. The drive plates of the front clutch 6 are externally integrally splined to the drum 24 and the clutch disks are internally splined to a hub 26 in a slip preventing manner. The hub 26 is integrally splined to an intermediate shaft 8. The front clutch drum 24 is also splined, as shown in the figure, to the clutch disks of a multiple plate clutch 7 (hereinafter referred to as a rear clutch) in a slippage preventing manner so as to rotate as a unit. The driven plates of the rear clutch 7 are externally splined to a rear clutch drum 27 to be integral with the latter. And a piston 28 turns the rear clutch 7 on or off.

Figure 3:
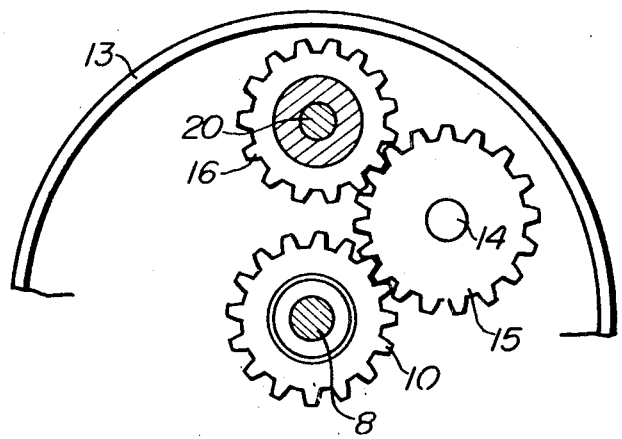
FIG. 3 is a partial sectional view taken on the line A—A of FIG. 2, showing in detail the relationships between an idler gear not shown in FIG. 2 and gears associated therewith.

The intermediate shaft 8 which is integral with the hub 26 of the front clutch 6 has at its rear an integrally mounted input sun gear 9. The rear clutch drum 27 is integrally connected with a reverse sun gear 10 through proper keying means. The input sun gear 9 is meshed with a gear 12 of pinions 11 in the planetary gear train which consist of a suitable number of pinions (e.g., two or three) arranged around the input sun gear 9. The reverse sun gear 10 meshes with an idler gear 15 (shown in FIG. 3) which is slidably mounted on a pin 14 studded on a pinion carrier 13 and the idler gear 15 in turn meshes a gear 16 of the pinions 11.

The rearmost gear 17 of the pinions 11 is meshed with a gear 19 mounted on a transmission output shaft 18. The pinion 11 comprising the gears 16, 12 and 17 and the pinion (idler gear) 15 are carried by the carrier 13 by means of pinion pins 20 and 14, respectively. The carrier 13 is provided with a braking band 21 (hereinafter referred to as a rear brake band) so that the carrier 13 is locked in position or set free to rotate depending on whether the rear brake band 21 is applied or released. Similarly, the rear clutch drum 27 is provided with a brake band 22 (hereinafter referred to as a front brake band) which is positioned around the former so that the drum 27 and consequently the sun gear 10 are locked or set free depending on whether the front brake band 22 is on or off.

A one-way clutch 23 which is built in the carrier 13 operates in the same manner as the rear brake band 21 in low gear as will be discussed latter.

With the arrangement described above, the actions in the transmission in the three forward speeds and one reverse speed will now be explained.

First speed—The front clutch 6 and the rear brake band 21 are applied (However, when the drive is provided from the engine side, the one-way clutch 23 will produce the same result without the operation of the rear brake band 21 so that the provision of the one-way clutch 23 may dispense with the action of the rear brake band 21. In this case, however, no driving force will be transmitted from the output shaft 18). With both the clutch 6 and the band 21 on, the rotation of the turbine shaft 5 is directly carried to the input sun gear 9 through the front clutch 6. Since the carrier 13 is locked by the rear brake band 21, the pinion pin 20 is also held stationary and the input power is transmitted to the gear 19 on the output shaft through the gear 9, the gear 12 and through the gear 17 in the same relation as in the ordinary gear trains at a reduced speed.

Second speed—With the front clutch 6 remaining on, the rear brake band 21 is now released and the front brake band 22 is applied. While this permits the turbine shaft 5 and the input sun gear 9 to rotate as a unit, the rear clutch drum 27 and hence the reverse sun gear 10 are locked in position by the front brake band 22. In this state, the rotation of the turbine shaft 5 is directly transmitted to the input sun gear 9 which in turn tends to rotate the pinions 11 in a direction (counterclockwise) opposite to the direction of rotation (clockwise) of the turbine shaft 5. This movement tends to rotate the idler gear 15 clockwise through the gear 16. However, as the gear 10 meshing with the gear 15 is held stationary, the pinion pin 14 revolves around the sun gear 10 in a clockwise direction. This revolving motion is added to the input sun gear 9 and the output shaft gear 19 which rotate in the same direction as the turbine shaft 5. Due to the fact that the number of teeth in the gear 12 is greater than that in the gear 17, the effect of the added revolving motion is greater than on the side of the input shaft and thus the number of revolutions of the intermediate shaft 8 is greater than that of the output shaft 18. In other words, a speed reduction is attained.

Third speed—This speed is obtained by applying both the front and rear clutches. Since the input sun gear 9 and the reverse sun gear 10 rotate together, the entire planetary gear assembly rotates as a single unit and thus the output shaft 18 rotates at the same speed as the turbine shaft 5.

Reverse—The rear clutch 7 and the rear brake band 21 are applied. This locks the carrier 13 and hence the pinion pins 14 and 20 and simultaneously the drive from the turbine shaft 5 is carried through the rear clutch 7 to the reverse sun gear 10 and through the pinions 15, 16 and 17 to the gear 19 on the output shaft 18. Thus, the output shaft 18 rotates in the reverse direction.

HYDRAULIC ACTUATION CIRCUIT

The arrangement of a hydraulic actuation circuit used with the present invention is illustrated in FIGS. 4 through 8. Briefly, the hydraulic actuation circuit comprises an oil pressure source 100 and an actuation circuit 110 which in turn comprises a manual valve 120, 1–2 shift means 130 and 2–3 shift means 135, a check valve 140 and oil passages. The oil pressure source 100 comprises an oil pump 101, an oil strainer 102, a pressure regulator valve 105, a relay valve 150, a check valve 103 and an oil cooler 104, and the oil pressure source 100 functions to supply the oil for operating the torque converter, the oil for lubricating the transmission gears and the suitable pressure for the hydraulic actuation circuit.

Figure 4:
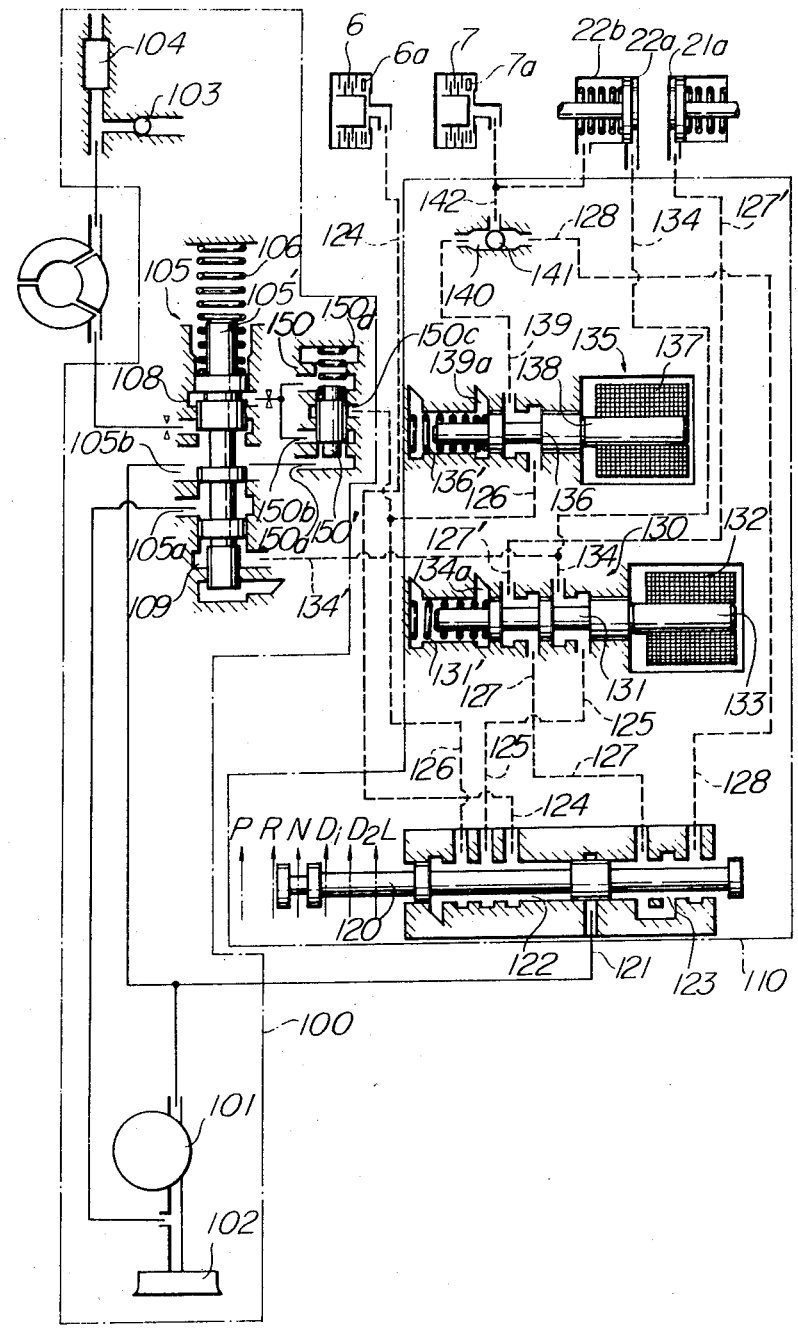
FIGS. 4 through 8 are hydraulic diagrams showing the conditions of a hydraulic actuation circuit incorporated in the system of the present invention, the conditions corresponding to various operating positions, FIG. 4 showing the conditions in the N position, FIG. 5 in $D_1$ third speed position, FIG. 6 in $D_2$ second speed position, FIG. 7 in L first speed position, and FIG. 8 L second speed position.
Figure 5:
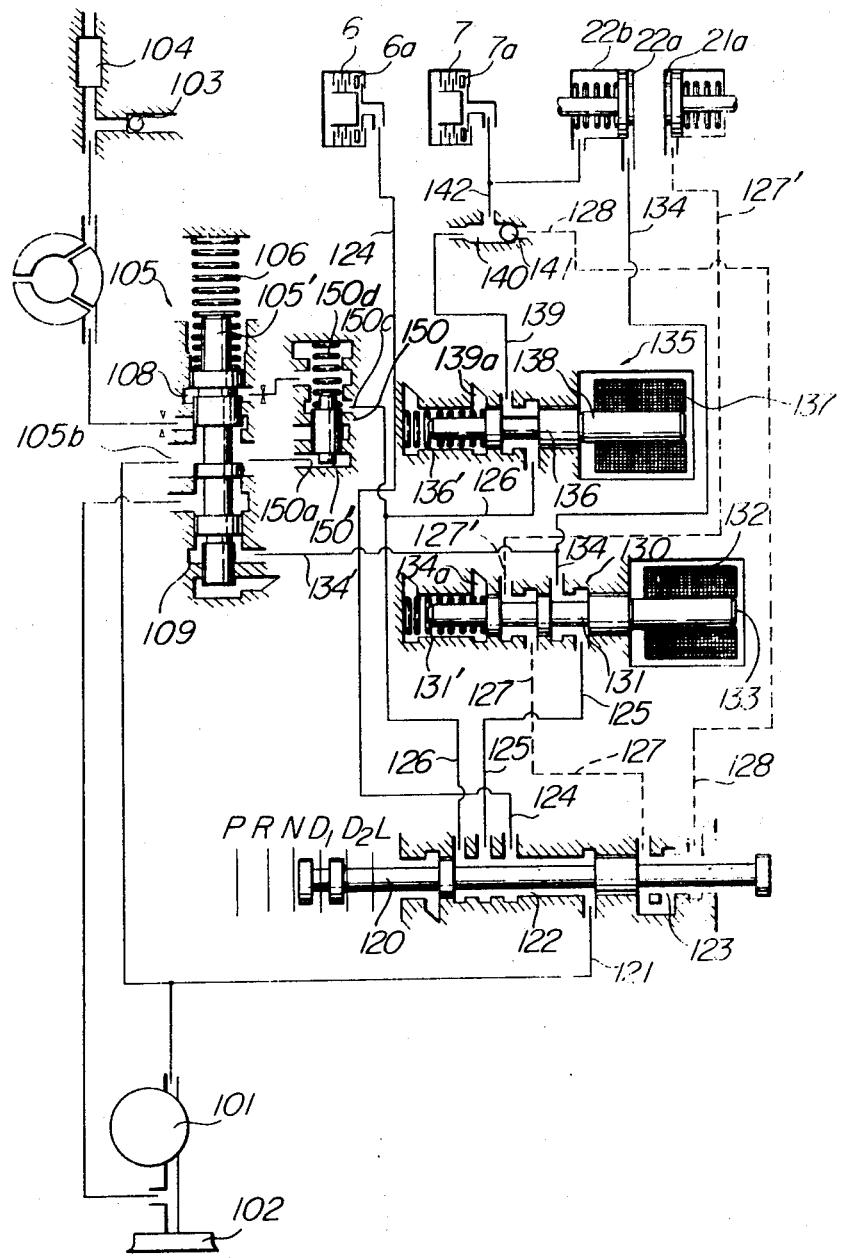
Figure 6:
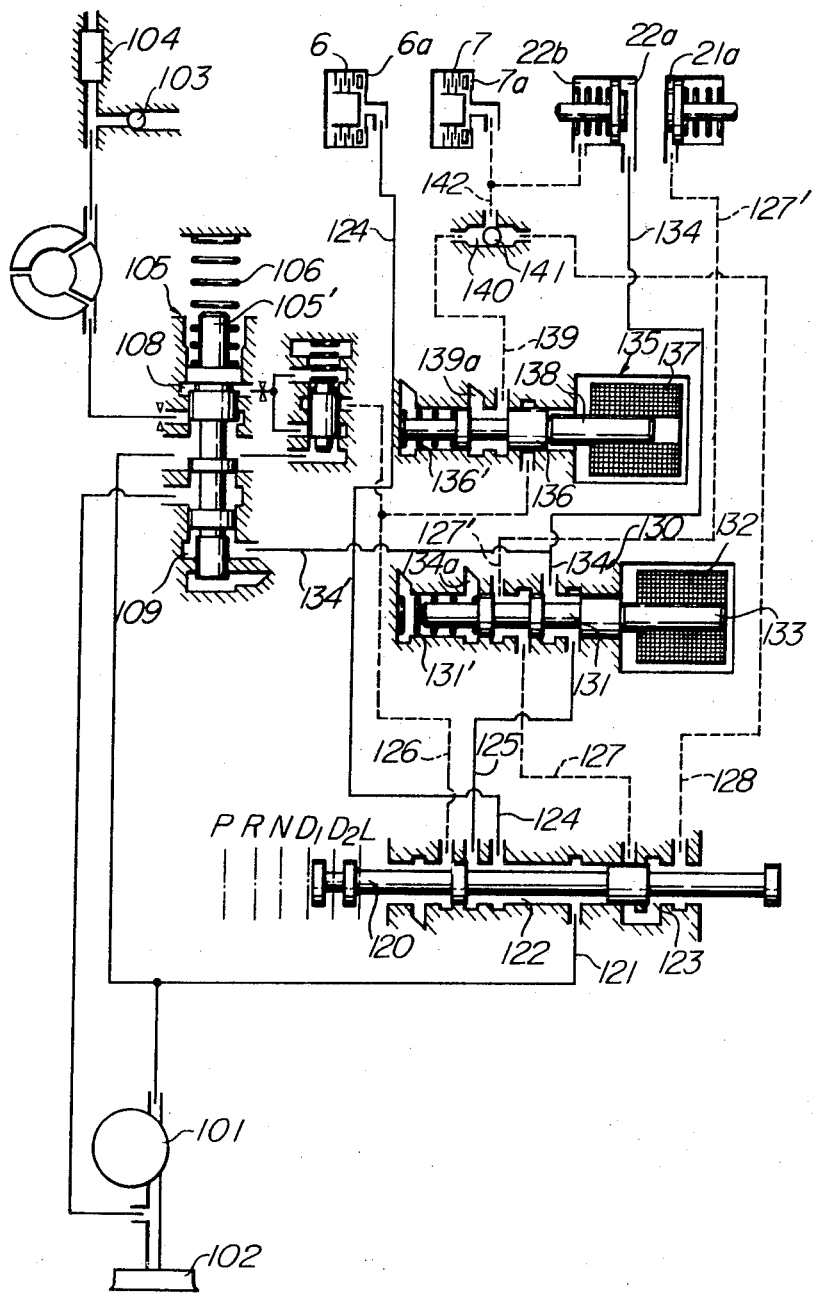
Figure 7:
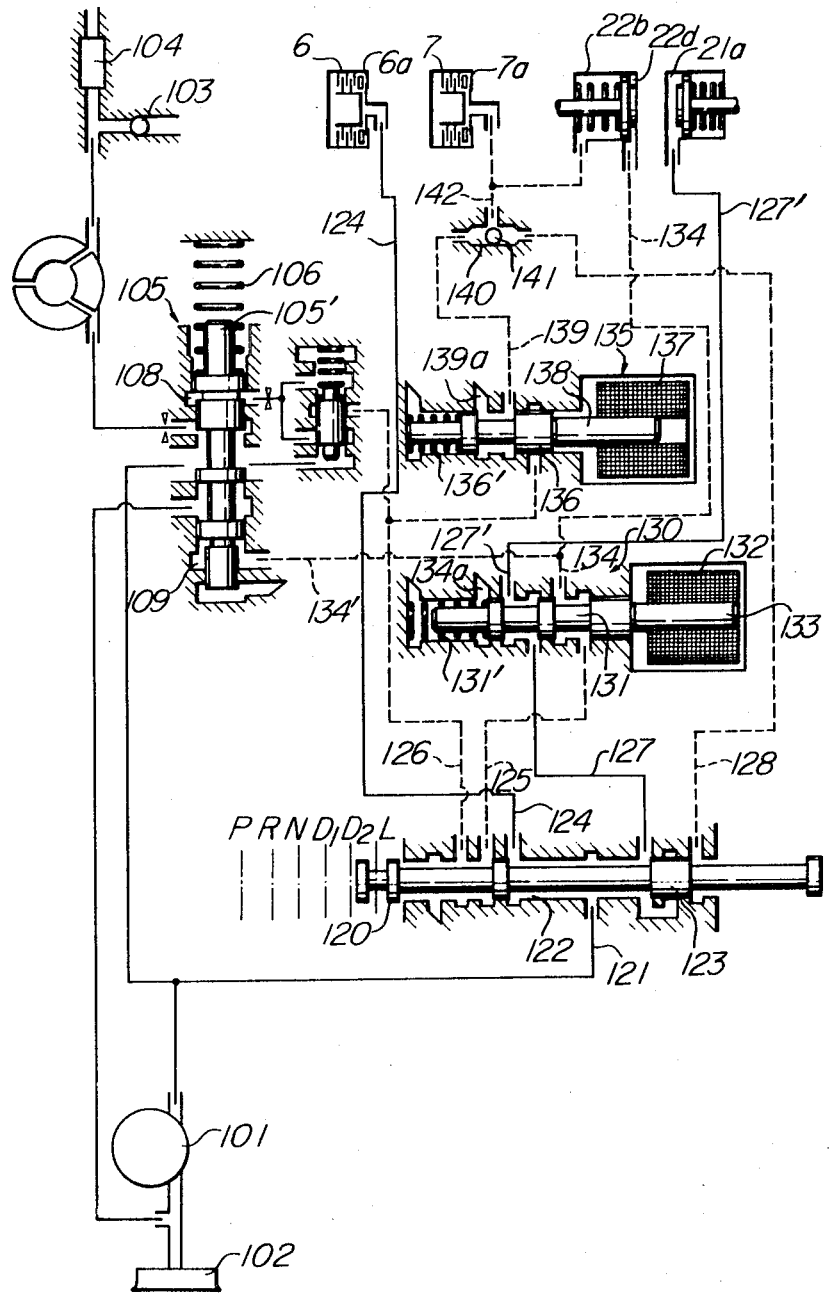
Figure 8:
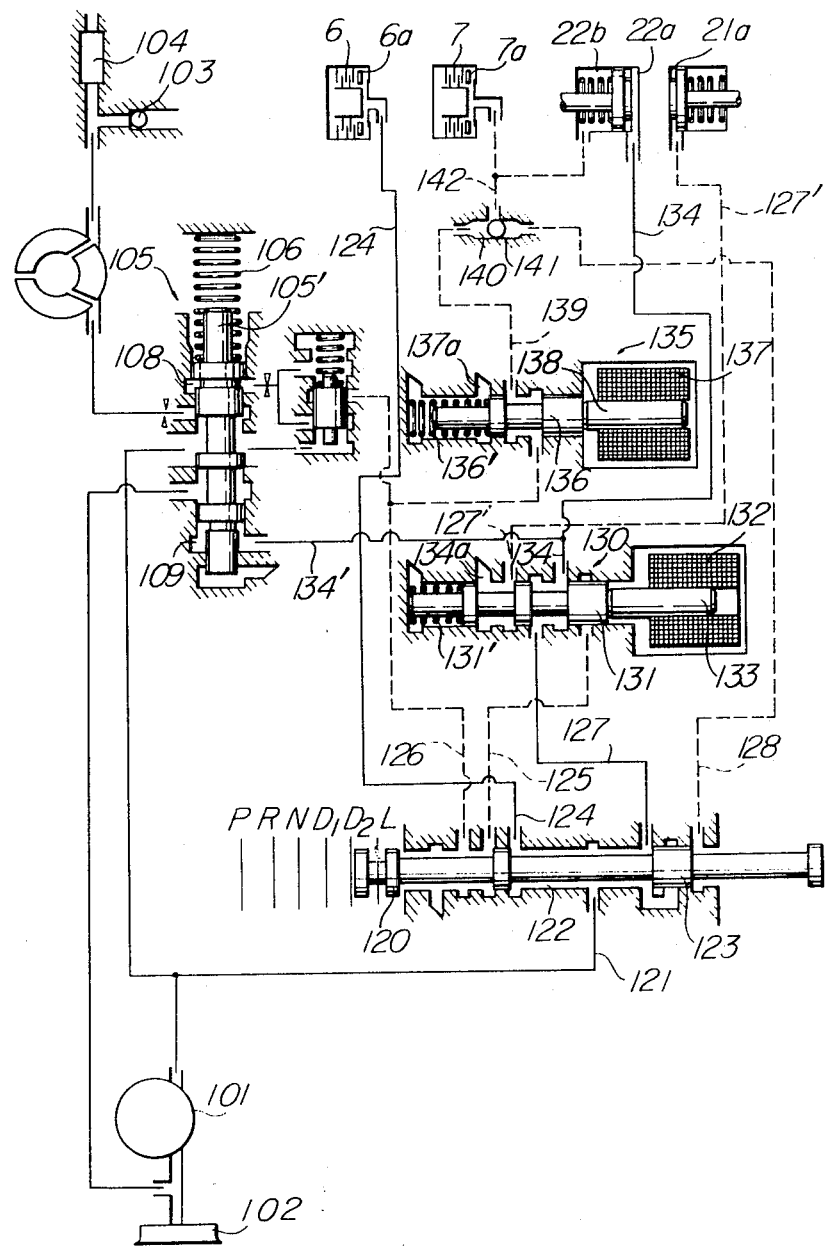

The manual valve 120 is linked to a shift lever 601 (shown in FIGS. 11 and 12) installed in the driver's compartment and it has six positions: P, R, N, $D_1$, $D_2$ and L. As shown in FIG. 4, with the manual valve 120 in the N position an oil passage 121 is shut off and valve chambers 122 and 123 are exhausted. Moving the manual valve 120 to the $D_1$ position communicates the oil passage 121 with the oil passages 124, 125 and 126 as shown in FIG. 5. The oil passage 124 directly communicates with a front clutch servo chamber $6_a$, the oil passage 125 leads to a front brake band apply side $22_a$ through the 1–2 shift means 130, and the oil passage 126 is connected with a rear clutch servo chamber $7_a$ and a front brake band release side $22_b$ through the 2–3 shift means 135 and the check valve 140. The 1–2 shift means 130 is composed of a valve 131 and a solenoid 132 with the valve 131 being abutted as its one end (or right-hand side in the illustration) by a moving core 133 of the solenoid 132. When no current is supplied to the solenoid 132, the valve 131 is moved into its rightward position by a spring $131_a$ engaging the other end (or left-hand side in the illustration) of the valve 131 so that the oil passages 125 and 134 now communicate with each other thereby applying the front brake band 22. When the solenoid 132 is energized so that its electromagnetic force causes the moving core 133 to move the valve 131 to the left, communication between the oil passages 125 and 134 is cut off and the oil passage 134 now communicates with an oil passage 127 so that it is exhausted to release the front brake band 22. Similarly, the 2–3 shift means 135 consists of a valve 136 and a solenoid 137, and the valve 136 has one end (or right-hand side in the illustration) engaged by a moving core 138 of the solenoid 137. When the solenoid 137 is not energized, the valve 136 is moved into its rightward position by means of a spring $136_a$ engaging the other end (or left-hand side in the illustration) of the valve 136. This causes the oil passages 126 and 139 to communicate with each other and a check ball 141 of the check valve 140 is urged towards an oil passage 128 to close it so that oil passages 139 and 142 now communicate with each other to apply the rear clutch 7 and disengage the front brake band 22. When the solenoid 137 is energized, the valve 136 is moved to the left so that the connection between the oil passages 126 and 139 is broken and the oil passage 139 is connected to an exhaust port $139_a$ thus exhausting the oil pressure in the oil passage 139.

In the first speed at the $D_1$ drive range position or $D_1$ position-first speed, both the solenoids 132 and 137 are energized and the front clutch 6 is solely applied through the oil passage 124 of the manual valve 120. Thus, when the drive is provided from the engine side, the one-way clutch 23 is engaged to lock the carrier 13 thereby providing the first speed. In this case, however, no power is transmitted from the output shaft and a freewheeling condition takes place.

In the second speed at the $D_1$ drive range position or $D_1$ position-second speed, the oil passage 124 remains engaging the front clutch 6 and the 1–2 shift solenoid 132 is now deenergized so that oil passage 125 communicates with the oil passage 134 to apply the front brake band 22 and the second speed results.

In the third speed at the $D_1$ drive range position or $D_1$ position-third speed (cf. FIG. 5), under the conditions in the second speed, the 2–3 shift solenoid 137 is further deenergized. This causes the oil passage 126 to communicate with the oil passage 139 to apply the rear clutch 7 and disengage the front brake band 22, thus providing the third speed.

Now, as the manual valve 120 is moved to the $D_2$ position (cf. FIG. 6), the oil passage 126 leading to the 2–3 shift valve 135 is exhausted and only the oil passages 124 and 125 are now connected to the oil pressure source. In this state, therefore, the third speed cannot be obtained in spite of the condition of the 2–3 shift solenoid 137 corresponding to the third speed, and only the first and second speeds are selected depending on the energization and deenergization of the 1–2 shift solenoid 132.

When the manual valve 120 is moved to the L position, the oil pressure to the oil passages 125 and 126 are shut off and only the oil passages 124 and 127 are connected with the oil pressure source. Under these conditions, when the 1–2 shift solenoid 132 is not energized (cf. FIG. 7), the valve 131 is placed in its rightward position so that the oil passages 127 and $127_a$ communicate with each other and the rear brake band 21 is applied. Consequently, the front clutch 6 and the rear brake band 21 are actuated and the first speed results. This first speed is different from the first speed in the $D_1$ position and the rear brake band 21 is now being applied so that the power is also transmitted from the output shaft side and the engine will now exert a braking effect on the vehicle. When the solenoid 132 is energized (cf. FIG. 8), the valve 131 is moved to its leftward position so that the oil passage 127 communicates with the oil passage 134 and the oil passage $127_a$ is connected with the exhaust port $134_a$. When this happens, the front brake band 22 is applied and the rear brake band 21 is released thus giving the second speed.

When the manual valve 120 is moved to the R position, the oil passages 124, 125 and 126 are all exhausted and the oil passages 127 and 128 are now connected with the oil pressure source. This actuates the rear clutch 7 and the rear brake band 21 and the reverse is obtained.

Now considering the above described hydraulic circuit in further details, the circuit is so constructed that when the manual valve 120 is in the $D_1$ position the oil passages 124, 125 and 126 are connected with the oil pressure source, and at the same time the oil passage 124 is directly connected to the front clutch 6, the oil passage 125 to the front band apply side $22_a$ through the 1–2 shift means 130 and the oil passage 126 to the rear clutch 7 and the front band release side $22_b$ through the 2–3 shift means 135, whereas with the manual valve 120 in the $D_2$ position the oil passage 126 leading to the 2–3 shift valve 136 is exhausted and the oil passages 124 and 125 are connected with the oil pressure source, and with the manual valve 120 in the L position the oil passage 125 leading to the 1–2 shift valve 131 is exhausted, the oil passage 127 is connected with the oil pressure source and the oil passage 127 is further connected through the 1–2 shift means 130 with either the oil passage 134 leading to the apply side $22_a$ of the front brake band servo or the oil passage $127_a$ leading to the oil chamber $21_a$ on the apply side of the rear brake band servo; while on the other hand the 1–2 shift valve 131 and the 2–3 shift valve 136 are provided on the left ends thereof with springs $131_a$ and $136_a$ so that the valves are biased into their rightward positions when the solenoids 132 and 137 are not energized. Thus, even when the supply of voltage is stopped to the shift signal control system which determines whether the solenoids 132 and 137 should be energized or deenergized, the manual valve may be operated so that the first speed is obtained in the L position, the second speed in the $D_2$ position and the third speed in the $D_1$ position. Moreover, in the L position the oil passage 127 is connected to the apply side chamber $22_a$ of the front brake band servo and to the apply side chamber $21_a$ of the rear brake band servo through the 1–2 shift means 130 so that when the shift is made to the L position at high engine speeds, the solenoid 132 may be energized to maintain the second speed condition thereby keeping the engine from overrunning.

With the hydraulic circuit construction described above, when trouble occurs with the shift signal control system which controls the signals to the solenoids or when a sporty drive with more varied shift points as compared with those which are effected by the electrical control system is required, a switch connecting the shift signal control system with the voltage source opened to cut off the supply of current to the shift signal control system to make it inoperative. The manual valve then moved by means of the shift lever to the 1, 2 or 3 positions thereby giving the driver the facility to select any desired speed ratio at will when driving the vehicle. In other words, the "on-off" operation of this switch gives the driver a choice of either the fully automatic or semiautomatic selection of various gear ratios that suit the desired driving conditions.

Another feature of the hydraulic circuit according to the present invention resides in that during the shift to the L position at the high-speed driving the solenoid 132 may be energized from the shift signal control system so that braking by the engine in the first instance does not take place to thereby prevent the engine from abruptly exerting a braking effect on the vehicle or from causing it to overrun.

A still further feature resides in that with the transmission in the third speed the solenoids 132 and 137 are not energized and there is thus no necessity to give consideration to electrical power consumption, temperature rise (heat generation) and the like due to the energization of the solenoids.

The oil pressure to the servos (which is hereinafter referred to as the line pressure) is controlled by means of a pressure regulator valve 105 whose operation will be explained hereunder. The pressure regulator valve 105 comprises a valve spool $105_a$ having a spring 106 engaging the upper end of the valve spool. A chamber 108 located in the upper section of the valve spool $105_a$ is supplied with oil from the oil pump 101 through a relay valve 150. When the manual valve 120 is in the $D_1$ position, oil is directed to the chamber 108 through the oil passages 121 and 126. Oil is also supplied to a chamber 109 located in the lower section of the valve through an oil passage 134. With the arrangement just described, when the manual valve 120 is in the $D_1$ position (FIG. 5), the oil pressure from the oil pump 101 is admitted into an upper port $150_c$ of the relay valve 150 through oil passages 121 and 126. On the other hand, the oil pump pressure supplied through a port $105_b$ of the pressure regulator valve 105 is applied to a chamber $150_a$ located at the lower end of the relay valve 150. The oil pressure admitted into the port $150_c$ of the relay valve 150 and a spring $150_d$ engaging the upper end of the valve 150 force the relay valve in the downward direction. On the other hand, the oil pressure applied from the regulator valve 105 to the chamber $150_a$ at the lower end of the relay valve 150 forces the relay valve 150 in the upward direction. Since the oil pressure applied to the upper and lower ends of the relay valve 150 are of the equal value, the force acting in the downward direction is greater by the difference corresponding to the loading by the spring and the relay valve 150 is thus moved to its downward position. This admits the oil pump pressure into the chamber 108 of the regulator valve 105. On the other hand, the oil pressure in the oil passage 125 leading to the 1–2 shift valve 131 is admitted into the chamber 109 through the oil passage $134_b$ when the oil passage 125 is connected with the oil passage 134 by the movement of the 1–2 shift valve 131 to its rightward position due to the deenergization of the 1–2 shift solenoid 132. Under these conditions, the oil pressure produced by the pressure regulator valve 105 is a constant oil pressure $P_{LD}$ which is determined by the balance between the spring load of the spring 106 and the oil pressure force acting on the differential area of the valve spool $105_a$ due to the oil pressures (pump pressures) in the chambers 108 and 109.

Figure 9:
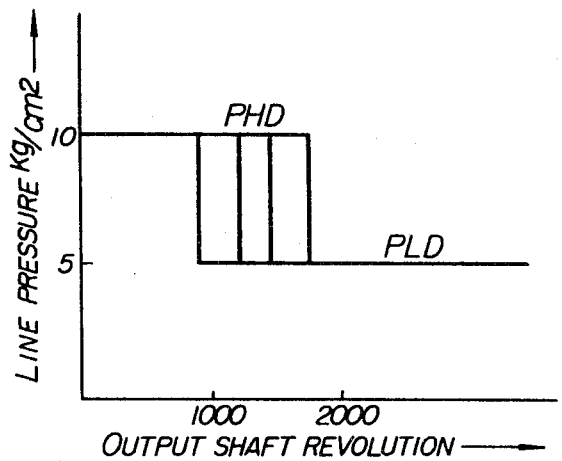
FIG. 9 is a graph showing, in the $D_1$ position, changes in the value of the line pressure controlled by the hydraulic circuit as plotted against the number of revolutions of the output shaft.

Then, as the 1–2 shift solenoid 132 is energized, the 1–2 shift valve 131 is moved to its leftward position so that the oil passage 134 is connected with the oil passage 127. This drains the oil pressure in the oil passage 134 and empties the chamber 109 of the pressure regulator valve 105. Thus, the oil pressure produced by the pressure regulator valve is a constant oil pressure $P_{HD}$ which is determined by the balance between the spring load of the spring 106 and the oil pressure force acting on the differential valve area due to the oil pressure (pump pressure) in the chamber 108. In other words, in the $D_1$ position of the manual valve the pressure regulator valve 105 produces a relatively high constant oil pressure $P_{HD}$ in the first speed with the 1–2 shift valve 131 placed in the leftward position, and it produces the constant low oil pressure $P_{LD}$ in the second and third speed conditions with the 1–2 shift valve 131 in the rightward position. FIG. 9 illustrates the oil pressure characteristics attained in the $D_1$ position. As will be seen from FIG. 9, when the output shaft revolutions (vehicle speed) increases shifting from the first to the second speed, a stepdown is effected from the constant relatively high oil pressure $P_{HD}$ to the constant low oil pressure $P_{LD}$. Since the 1–2 shift point is generally varied according to the engine torque responsive signal, this stepdown point for the oil pressures also varies according to the engine torque responsive signal as shown in the figure.

Figure 10:
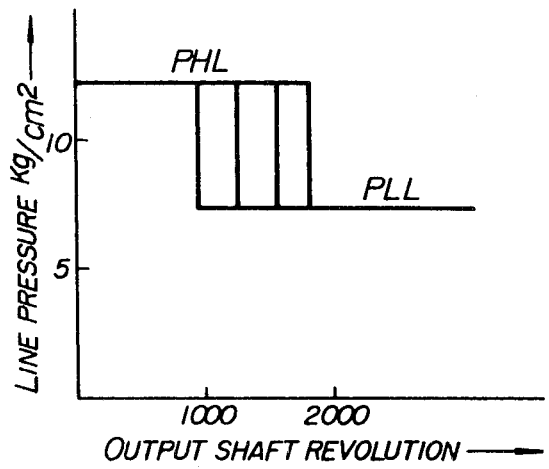
FIG. 10 is a graph showing, in the $D_2$ or L position, changes in the value of the line pressure controlled by the hydraulic circuit as plotted against the number of revolutions of the output shaft.

When the manual valve 120 is moved to the positions other than the $D_1$ position, the oil passage 126 is exhausted so that a pressure $P_{MO}$ (hereinafter referred to as the reducing pressure), that is, the oil pump pressure is reduced by a value corresponding to the load of the spring $150_d$ is admitted from the chamber $150_a$ of the relay valve 150 into the chamber 108 of the pressure regulator valve 105. When the manual valve 120 is in the $D_2$ or L position, oil pressure is directed through the oil passage 125 or the oil passage 127, respectively, so that, through the oil passage $134_b$, the oil pressure is admitted to or shut off from the chamber 109 of the pressure regulator valve 105 depending on the positions of the 1-2 shift valve 131 as is the case in the $D_1$ position. When the oil pressure is directed into the chamber 109, the pressure regulator valve 105 produces a constant relatively low oil pressure $P_{LL}$ which is determined by the spring pressure of the spring 106, the reducing pressure $P_{MO}$ in the chamber 108 and the pump pressure in the chamber 109. When there is no oil pressure in the chamber 109, the pressure regulator valve 105 produces a constant high oil pressure $P_{HL}$ which is determined by the spring pressure of the spring 106 and the reducing pressure $P_{MO}$ in the chamber 108. In the P, R and N positions of the manual valve, the chamber 109 is always emptied so that the pressure regulator valve 105 produces a constant high oil pressure $P_{HL}$. Thus, with the manual valve in the $D_2$ and L positions, the constant high oil pressure $P_{HL}$ is produced in the first speed operating condition and the constant relatively low oil pressure is produced in the second speed condition, while the constant high oil pressure $P_{HL}$ is produced in the P, R and N positions. The oil pressure characteristics attained in the various positions of the manual valve are shown in FIG. 10. FIG. 10 illustrates the oil pressure characteristics in the same manner as in FIG. 9, and while it will be seen from the two graphs that the curve representing the changes in the controlled oil pressure plotted against the output shaft revolutions (vehicle speed) steps down with the 1-2 change up, the value of the controlled oil pressure is generally higher in the case of FIG. 10 than in FIG. 9. This arises from the fact that the varied oil pressures are admitted into the chamber 108 of the pressure regulator valve 105.

It is evident that in the embodiment described above the controlled oil pressure characteristics as previously detailed are obtained according to the above described oil pressure control method. Thus, at the lower vehicle speeds the line pressure taking into consideration the torque multiplication action of the torque converter is directed into the hydraulic servo chambers for the clutches and brake bands while at the higher vehicle speeds the torque converter acts as a fluid coupling or is near to such a state and thus no torque multiplication action is effected so that the constant low line pressure is admitted to the hydraulic servo means to thereby eliminate the loss of power due to the oil pump loss and the like. Particularly, use is made of the relay valve 150 to change the controlled oil pressure used in the $D_1$ position from those used in connection with other positions so that in the R position a sufficient and proper oil pressure is directed to the rear clutch 7 and the rear brake band 21, and a slightly higher oil pressure different from one used in the $D_1$ second speed position is employed for starting in the second speed at the $D_2$ position which is additionally provided for giving variety to the driving, thereby permitting taking into consideration the torque multiplication at the lower vehicle speeds. Furthermore, since the shift valves for shift control are concurrently utilized as means for changing the controlled oil pressures in accordance with the driving conditions, there is no need to provide additional valve means for varying the oil pressure control action and this remarkably simplifies the hydraulic circuit.

It is thus evident from the foregoing that the oil pressure control system of the hydraulic actuation circuit incorporated in the present invention has various features and is a useful one, but it does not constitute any part of the subject matter of the present invention and a patent will be separately applied for it.

It should be now understood that the 1-2 shift means 130 and the 2-3 shift means 135 are actuated to vary the pressure regulating action of the pressure regulator valve 105 and effect the automatic gear changing action, which are in fact accomplished depending on whether the solenoids 132 and 137 are energized or not.

The shift control system which supplies or cut-offs current to the solenoids 132 and 137 will now be explained below.

SHIFT CONTROL SYSTEM

Briefly, the shift control system comprises the shift position selection system and the shift signal control system. In the discussion to follow, the shift control system will be described in conjunction with two embodiments of the present invention and the embodiment I will be first explained.

EMBODIMENT I

SHIFT POSITION SELECTION SYSTEM

Shift position selection system 600 comprises a shift lever 601, a neutral safety switch 610, a circuit opening switch 620, etc. FIGS. 11 and 12 are schematic diagrams showing an example of the shift position selection system, FIG. 11 illustrating the shift position selection system 600 as viewed from above and FIG. 12 shows the system in section as taken through the line B—B of FIG. 11. In FIGS. 11 and 12, the shift lever 601 pivots around a control shaft 604 and it is connected to the manual valve 120 of the hydraulic actuator circuit through the linkage comprising a shift lever pin 603, a shift lever support 602 and a control shaft 604 which is integral with the shift lever support 602. In order to actuate the manual valve 120, the shift lever 601 is adapted such that it not only moves longitudinally (in the direction $a$ in FIG. 11), but also shifts laterally (in the direction $b$ in FIG. 11) as it turns on the control shaft 604, guided by the shift lever pin 603. A spring 7 is disposed around the pin 603 and urges the shift lever 601 to the right (the full-line position in FIG. 12). A shift lever detent plate 608 is securely mounted on a console 611 secured to a body floor 612 and it is formed with an H-shaped shift lever guide gate. Disposed near the slotted gate of the detent plate 608 is an indicator scale marked as follows: L, $D_2$, $D_1$, N, P and 1, 2, 3. These letters and numbers show different available positions for the shift lever 601. When the shift lever 601 is placed in the L and 1 positions, the manual valve 120 of the hydraulic actuation circuit which is linked to the shift lever is moved to the L position in FIG. 7. Thus, when the shift lever is positioned in the $D_2$ and 2 positions, $D_1$ and 3 positions and in positions N, R and P, respectively, the manual valve is correspondingly moved to the $D_2$ position, FIG. 6, $D_1$ position, FIG. 5, and to the positions N, R and P, respectively.

The circuit opening switch 620 is mounted on a shift lever plate 613 shown in FIG. 12 so that when the shift lever is tilted to move it to one of the positions 1, 2 and 3 in the left-hand slot of the detent plate, the switch 620 opens the circuit connecting the power source to the neutral safety switch 610 to cut off the supply of current to the shift signal control system.

The neutral safety switch 610 is mounted on a shift lever plate 613 and comprises contacts and a slider 614 as shown in FIG. 13, and the slider 614 moves together with the shift lever pin 603. Letters marked on these contacts, i.e., L, $D_2$, $D_1$, N, R and P correspond to the respective lettered positions of the manual valve in the hydraulic actuation circuit. This switch supplies current to the shift signal control system from the circuit opening switch 620 in the forward speed range positions L, $D_1$ and $D_2$.

As described above, when the driver moves the shift lever 601 at will to the different positions, the shift position selection system 600 operates the manual valve 120 of the hydraulic actuation circuit to provide the oil pressure circuits for the driver's different shift lever ranges and at the same time actuates the neutral safety switch 610 and the circuit opening switch 620 to control the supply of current to the shift signal control system. The shift signal control system incorporated in the present embodiment will be explained below.

SHIFT SIGNAL CONTROL SYSTEM

The shift signal control system comprises signal detecting means which detect the engine throttle opening and the number of revolutions of the transmission output shaft, discrimination circuits in which the two signals are compared and operated on, a power unit which receives the current from the neutral safety switch and feeds it to the various circuits of the system. These essential units of the present system will be explained below.

As shown in FIG. 13, when the shift lever is in the forward speed range positions, current is supplied from the power source to a power unit 700 through the circuit opening switch 620 and the neutral safety switch 610. The power unit 700 feeds the current to the various circuits of the system so that they start to operate. Therefore, unless otherwise specified, the signals referred to hereinafter will mean DC voltages from the positive plate with the negative plate being grounded.

The output shaft r.p.m. detecting unit 201 consists of an output shaft r.p.m. detector 70 and a D–A converter 310. As shown in FIGS. 14a and 14b, the output shaft r.p.m. detector 70 is composed of an r.p.m. indicator 71 secured to a housing 30 and a toothed disk 72 which is integrally mounted on the output shaft 18 so that if the number of teeth in the disk 72 is $n$ (for example, $n=32$), the r.p.m. indicator 71 produces an electrical signal $S(S=n \cdot N)$ which is $n$ times the revolutions $N$ of the output shaft 18.

To measure the output shaft revolutions N is to detect the driving conditions of the vehicle, i.e., the vehicle speed. The output shaft r.p.m. detector 70 is constructed such that its toothed disk 72 is coaxially securely mounted on the output shaft 18 to rotate together, and as will be seen from FIG. 14a showing one side of the disk 72, it consists of a circular plate of magnetic material having 32 teeth formed on its periphery in equally spaced relation and the r.p.m. indicator 71 is fixed to the housing 30 at a position externally very close to the disk 72 in the diametrical direction of the latter. The r.p.m. indicator 71 is composed of a permanent magnet 91 and a coil 92 wound around the former and they are housed in a suitable casing of nonmagnetic material which is mounted on the transmission housing so that one end of the permanent magnet 91 is located very close to the outer periphery of the toothed disk 72. As the toothed disk 72 rotates so that its teeth portions pass through the magnetic filed of the permanent magnet 91, the leakage flux of the permanent magnet 91 is varied, thus producing an electromotive force in the coil 92. In the illustrated case, 32 voltage signals will be generated for each revolution of the toothed disk 72. Where the number of teeth in a toothed disk is n and its revolutions in a given time is N, the voltage signal produced will generally result in an AC voltage S having a frequency n·N as previously discussed. In the figures, numeral 93 designated output terminal of the r.p.m. indicator. It should be apparent that the vehicle speed may be detected from the output of the small generator just described which is mounted at the location of driven gears where the speedmeter cable is brought out for external connection.

The output signal (voltage) S from the output shaft r.p.m. detector 70 is applied to the D–A converter circuit 310 over a line 331.

The D–A converter circuit 310 is a circuit which connects the output signal S, a digital signal, into a DC voltage which is an analog signal. This D–A converter is constructed as shown in FIG. 15. The input signal (voltage) S is applied via the line 311, its amplitude is amplified by an amplifier 313, the resulted amplitude is then limited by an amplitude limiter 314 and this AC voltage is further converted by a frequency detecting rectifier 315 to a DC voltage which is then delivered over a line 312. The voltage waveforms are shown in FIG. 16. FIG. 16a shows the voltage waveform of the signal S which takes the same waveform after the amplification. FIG. 16b shows the output waveform of the amplitude limiter circuit 314 and FIG. 16c shows the waveform of output En of the frequency detecting rectifier circuit 315 which is the analog voltage proportional to the revolutions of the output shaft.

Figure 17:
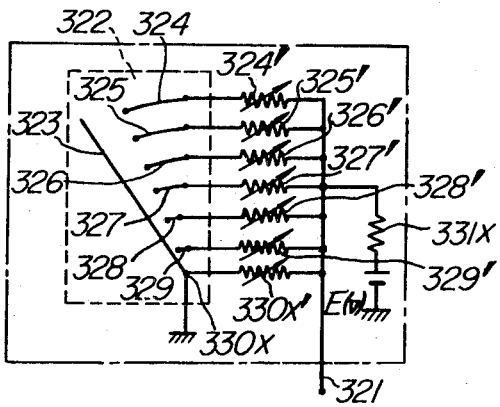
FIG. 17 is a diagram showing the construction of a throttle opening circuit used with the shift signal control system.

Next, the construction of the throttle opening detecting circuit 320 will be explained with reference to FIG. 17 in which numeral 322 designates a multistage switch which responds to the carburetor throttle (or the switch may be said to respond to the accelerator, and since this switch is an engine torque responsive signal detector, it may be adapted to respond to the displacement which represents the intake-manifold vacuum). The switch includes a movable contact 323 and fixed contacts 324, 325, 326, 327, 328 and 329 so that as the displacement $S\theta$ changes to $S\theta(1)$, $S\theta(2)$, $S\theta(3)$, $S\theta(4)$, $S\theta(5)$ and $S\theta(6)$ depending on the different throttle openings. The movable contact 323 is caused to disengage with the fixed contacts 324, 325, 326, 327, 328 and 329 successively as the throttle opening changes. The movable contact 323 is grounded. The fixed contacts 324, 325, 326, 327, 328 and 329 are connected with variable resistors 324', 325', 326', 327' and 329', respectively, and one end of a variable resistor 330'$_x$ is also grounded, the other ends of the variable resistors are connected with a common line 321. A resistor 311$_x$ is connected to the line 321 and a constant voltage E(V) from the power unit 700 is applied to the other end of the resistor 331$_x$. The variable resistor 330'$_x$ is adjusted so that as the throttle opening $S\theta$ is changed to $S\theta(7)$ at the wide-open carburetor throttle, voltage E(7) is produced on the line 321. Then, when the throttle opening is $S\theta(6)$, the movable contact 323 engages the fixed contact 329 only. The variable resistor 329' is so adjusted that at that time the output $E_b$ on the line 321 is $$E_b = \frac{R_6 \| R_7}{R_0 \| R_7 + R} E = E(6),$$

where R is the resistance value of resistor 331$_x$, $R_6$ and $R_7$ are the resistance values of the variable resistors 329' and 330'$_x$, and $R_6 \| R_7$ is the resistance value when the variable resistors 329' and 330'$_x$ are connected in parallel to each other. The variable resistor 328' is adjusted so that at $S\theta(5)$ the output $E_5$ on the line 321 is $$E_5 = \frac{R_7 \| R_6 \| R_5}{R_7 \| R_6 \| R_5 + R} E = E(5),$$

where $R_6$ is the resistance value of the variable resistor 328'. Similarly, the respective variable resistors 327', 326', 325' and 324' are adjusted so that the line 321 receives the output $E_4 = E(4)$ at the $S\theta(4)$, the output $E_3 = E(3)$ at the $S\theta(3)$, the output $E_2 = E(2)$ at the $S\theta(2)$ and the output $E_1 = E(1)$ at the $S\theta(1)$. Thus, the voltages $E(1)$, $E(2)$, $E(3)$, $E(4)$, $E(5)$, $E(6)$ and $E(7)$ appear on the line 321 in accordance with the corresponding throttle openings $S\theta(1)$, $S\theta(2)$, $S\theta(3)$, $S\theta(4)$, $S\theta(5)$, $S\theta(6)$ and $S\theta(7)$. That is, the stepped signals (voltages) $E(N)$ ($N=1, 2, 3, 4, 5, 6$ and 7) are produced on the line 321 in response to the various throttle openings. While the present embodiment has been described with $N=7$ (the number of fixed contacts used is six), more complicate stepped signals, if desired, may be attained by simply increasing the number of fixed contacts.

Figure 18:
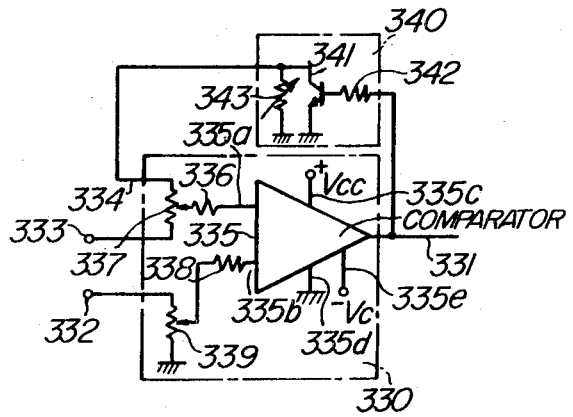
FIG. 18 is a schematic diagram showing the construction of a discrimination circuit and a feedback circuit used with the shift signal control system.

Next, the circuitry which receives and compares the two voltages to determine the shift point from first to second or second to first speed for the transmission will be explained. This operational circuit comprises a discrimination circuit 330, a feedback circuit 340 and an amplifier circuit 350. The discrimination circuit 330 and the feedback circuit 340 are constructed as shown in FIG. 18. In the figure, numeral 335 designates a comparator circuit which may be any one of the general purpose units now available on the market (for example, NEC's $\mu pc$ 71 and TI Company's SN72710N). Numeral 336 designates an input resistor whose one end is connected to an input terminal 335$_a$ of the comparator circuit 335 and the other end is connected to the movable terminal of a variable resistor 337. The two fixed terminals of the variable resistors 337 are connected to input terminals 333 and 334 of the discrimination circuit 330, respectively. Numeral 338 is a resistor having one end connected to an input terminal 335$_b$ of the comparator circuit 355 and the other end to the movable terminal of a variable resistor 339. The fixed terminal of the variable resistor 339 has its one end connected to an input terminal 332 of the discrimination circuit 330 and the other end of the ground. Numerals 335$_c$, 335$_d$ and 335$_e$ designate respectively a positive power supply terminal, a grounding terminal and a negative power supply terminal. On the other hand, the feedback circuit 340 is composed of a NPN-transistor 341, a resistor 342 and a variable resistor 343. The emitter of the NPN-transistor 341 is grounded and the base of the transistor is connected to the output line 331 of the discrimination circuit 330 through the resistor 342. The collector of the transistor 341 is connected to the movable terminal of the variable resistor 343 and this junction point is connected to an input terminal 334 of the discrimination circuit 330. The variable contact of the variable resistor 343 is grounded. In operation, assuming that the output line 331 of the discrimination circuit 330 is in its one state (or there is a voltage) when no signals are applied to the input terminals 332, 333 and 334, the transistor 341 of the feedback circuit 340 is turned on since the base current flows through the resistor 342, and the variable resistor 343 is short-circuited across it. When the throttle opening signal voltage $E(N)$ ($N=1, 2, 3$) and the output shaft r.p.m. signal voltage $E_n$ are applied to the input terminal 332 and 333 of the discrimination circuit 330, respectively, the voltage $E_{na}$ across the movable terminal of the variable resistor 337 is given as $$E_{na} = \frac{R_b}{R_a + R_b} E_n,$$

where $R_a$ = the resistance value between the input terminal 333 and the movable terminal of the variable resistor 337, $R_b$ = the resistance value between the said movable terminal and the collector of the transistor 341 in the feedback circuit 340 and $R_c$ = the resistance value of the variable resistor 343. Where $R_b$ represents the resistance value between the movable terminal of the variable resistor 339 and the input terminal 332 and $R_c$ represents the resistance value between the said movable terminal and the earth, the voltage $E_a(N)$ is given as, $$E_a(N) = \frac{R_c}{R_b + R_c}.$$

The voltage $E_{na}$ is applied through the resistor 336 to the input terminal 335a of the comparator circuit 335 and the voltage $E_a(N)$ is applied to the other input terminal 335b. The comparator circuit 335 compares the two voltages $E_{na}$ and $E_a(N)$ and it produces on the output line 331 a zero signal (zero signal voltage) when $E_{na}-E_a(N)$ is greater than zero and a "one" signal (signal voltage present) is given when the result of the comparison is negative. The resistors 336 and 338 function to protect the circuit when large inputs are applied to the input terminals. Further, the comparator circuit may be composed of a differential amplifier to which is connected a reference diode, Schmitt circuit or the like. When $E_{na}-E_a(N)$ >0 so that the output signal on the output line 331 of the discrimination circuit 330 becomes zero (zero signal voltage), no current is supplied to the base of the transistor 341 through the resistor 342 of the feedback circuit 340 and the transistor is thus cut off. The potential at the input terminal 335a of the comparator circuit 335 is then given as $$E_{nb} = \frac{R_b + R_c}{R_a + R_b + R_c} E_n$$

and hence $E_{nb} > E_{na}$ for the same $E_n$. Thus, the signal on the output line 331 of the comparator circuit 335 changes from zero to one at a lower value $E_n$ (lower vehicle speed) than when it changes from one to zero. In other words, depending on whether the signal voltage on the output line 331 is zero or one, the feedback circuit 340 varies the correction of the output shaft r.p.m. signal $E_n$ by the resistors to change the discrimination conditions of the discrimination circuit. In this manner, the signals on the output line 331 may be stabilized, thereby preventing the occurrence of any phenomenon which would cause "hunting" between on and off.

It will be understood from the foregoing that by properly adjusting the variable resistors 337, 339 and 343 of the discrimination circuit 330 and the feedback circuit 340, the relation $E_n = A\ E(N)$ between the output shaft r.p.m. signal $E_n$ and the throttle opening signal $E(N)$ when the signal on the output line 331 changes from one to zero and another relation $E_n = A'$ $E(N)$ between the two signals when the signal on the output line 331 changes from zero to one are computed, respectively. Thus, as the value of the signal $E_n$ increases and deviates into the region to the right of the curve $E_n = A\ E(N)$ in FIG. 19, the signal on the output line 331 changes from one to zero (zero voltage present). Contrary, when there is not voltage developed and then the value of $E_n$ drops until $E_n \leq A'\ E(N)$, the signal voltage is produced again on the output line 331.

The amplifier circuit 350 may be composed of a conventional amplifier circuit and its function is to actuate the solenoid 137. Therefore, this amplifier circuit may be dispensed if the solenoid 137 can be operated with the output signal from the discrimination circuit 330. The solenoid 137 will not be discussed further since it is generally known in the art. It should be apparent here that the discrimination circuit 330 may be constructed such that instead of providing a zero signal on the output line 331 when the input to the circuit has a relation $E_n = E(N) < 0$ as previously stated, the signal on the output line 331 changes to one to energize the solenoid 137 when the input to the circuit has a relation $E_n - E(N) > 0$. Further, the result will be the same even if the feedback circuit 340 which varies the potential at the input terminal 335a is caused to change the potential at the input terminal 335b in the reverse manner as the input terminal 335a.

On the other hand, the D-A converter circuit 310 is so designed that the voltage on the output line 312 becomes more positive as the frequency of signal from the input line 311, i.e., the vehicle speed increases. Thus, the output line 321 of the throttle opening circuit may be connected with the line 312 so that the input terminal 332 of the discrimination circuit 330 previously connected with the output line 321 is now connected to earth or a fixed voltage is applied to attain a zero balance. Under these conditions, the same relationships between the two signals may be established by arranging the throttle opening circuit 320 such that the resistance value between the output of the throttle opening circuit 320 and the earth decreases as the amount of throttle opening increases.

When the D-A converter circuit 310 is designed so that the voltage on the output line 312 becomes more negative as the vehicle speed increases, the same relationships between the two signals may be established, if the throttle opening circuit is constructed so that the resistance value between the output of the throttle opening circuit and the earth decreases in proportion to an increase in the amount of throttle opening and at the same time the outputs of the D-A converter circuit 310 and the throttle opening circuit 320 are connected in common with each other to the input terminal 333 of the discrimination circuit 330 and the input terminal 332 is connected to earth or a certain voltage is applied to provide a zero balance.

The circuitry for determining the shift point for the transmission to change from the first to second or second to first speed will be explained below. This circuitry includes a discrimination circuit 330′ and a feedback circuit 340′ for determining the shift point from the first to second or second to first speed in the D₁ and D₂ positions, a discrimination circuit 330″ and a feedback circuit 340″ for the shift point from the first to second or second to first speed in the L position, a gate circuit 354 to select the output signals from the discrimination circuits 330′ and 330″ by means of the signal from the neutral safety switch 610, and an amplifier circuit 356. In operation, the arrangement and operation of the discrimination circuit 330′ and the feedback circuit 340′ for computing the 1–2 or 2–1 shift point in the D₁ and D₂ positions are the exactly the same as in the case of the discrimination circuit 330 and the feedback circuit 340 for computing the 2–3 shift point. Thus, by suitably setting the variable resistors inserted in the two circuits 330′ and 340′, the relation $E_n = B'\ E(N)$ between the output shaft r.p.m. signal $E_n$ and the throttle opening signal $E(N)$ when the signal on the output line 331′ changes from one to zero (no voltage present) and the relation $E_n = B'E(N)$ between the two signals when the signal on the output line 331′ changes from zero to one (voltage present) will be calculated. It will thus be seen from FIG. 19 that as the output shaft r.p.m. signal becomes high enough to satisfy the condition $E_n \geq B\ E(N)$ no signal voltage appears on the output line 331' ("0" "1"), and as the signal $E_n$ subsequently drops to satisfy the condition $E_n \leq B'\ E(N)$ voltage is developed on the output line 331'.

Figure 20:
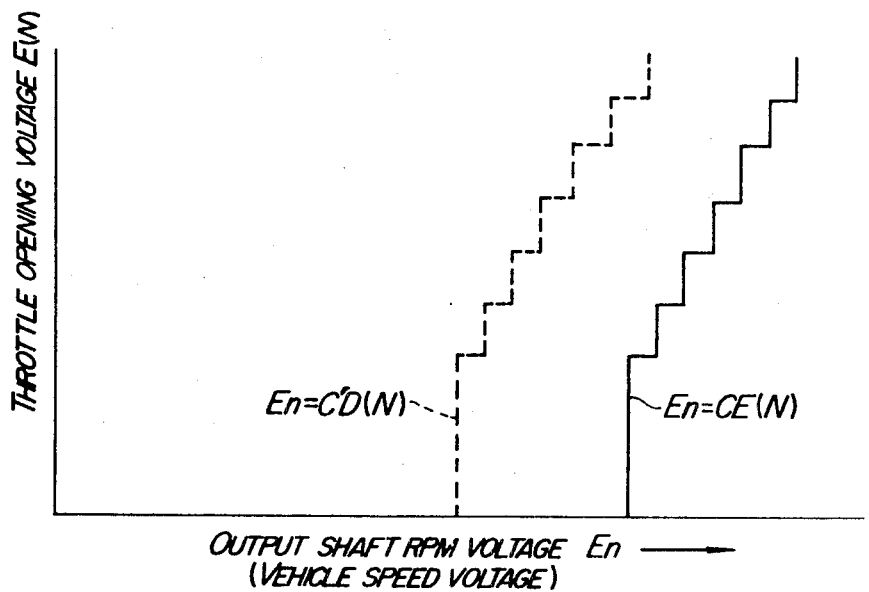
FIG. 20 is a graph showing, with the shift lever in the L position, the relationship between the output shaft r.p.m. signal and the throttle opening signal for explaining the shift ranges of the invention.

The arrangement of the discrimination circuit 330'' and the feedback circuit 340'' for computing the 1–2 shift point in the L position is the same as that of the previously discussed discrimination circuit 330 and the feedback circuit 340. In this case, however, the two signals are applied to the inverse input terminals, that is, while the case of the discrimination circuit 330 the output shaft r.p.m. signal $E_n$ is applied to the input terminal 333 and the throttle opening signal $E(N)$ to the input terminal 332, the discrimination circuit 330'' receives the throttle opening signal $E(N)$ at the input terminal 333'' and the output shaft r.p.m. signal $E_n$ at the input terminal 332''. Accordingly, the operation of the feedback circuit 340'' has an effect on the throttle opening signal $E(N)$ so that the voltage applied to the movable terminal 336'' of the discrimination circuit 330'' when there is a signal voltage on the output line 331'' (one state) will be lower than when there is no signal voltage on the output line 331'' (zero state) due to the actuation of the transistor in the feedback circuit 340''. A comparator circuit 335'' compares voltages $E_a(N)$ and $E_{an}$ applied to the movable terminals of the variable resistors 337'' and 339'' and produces on its output 331'' a zero signal (zero signal voltage) when $E_a(N)-E_{an}$ is greater than zero and a one signal (signal voltage present) when $E_a(N)-E_{an}$ is negative. With the circuit arrangement just described, the variable resistors in the discrimination circuit 330'' and the feedback circuit 340'' may be suitably adjusted so that the relation $E_n=C\ E(N)$ between the output shaft r.p.m. signal $E_n$ and the throttle opening signal $E(N)$ when the signal on the output line 331'' changes from zero to one and the relation $E_n=C'\ E(N)$ between the two signals when the said output signal changes from one to zero will be calculated. FIG. 20 shows the relation between the two voltages $E(N)$ and $E_n$ in this circuit, and the signal on the output line 331'' changes from zero to one when the value of $E_n$ rises to a level in the region to the right-hand side of the curve $E_n=C\ E(N$ on the graph, that is, the signal voltage is produced on the output line 331''. Contrary, as the value of $E_n$ drops to $E_n \leq C'\ E(N)$ with the signal voltage in its one state, the signal on the output line 331'' changes from one to zero and the signal voltage disappears. The outputs from the two discrimination circuits 330' and 330'' are applied to the inputs of the gate circuit 354 so that these outputs are selectively coupled to the output line 355 of the gate circuit 354 depending upon the L position signal from the neutral safety switch 610.

Figure 21:
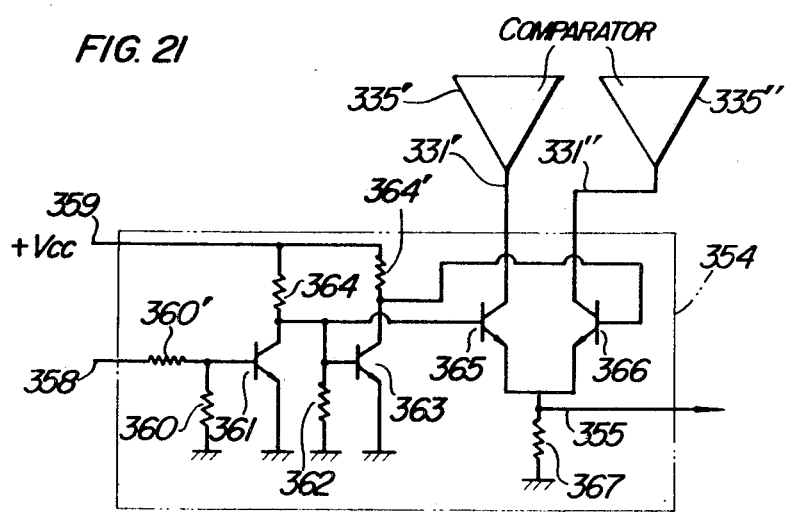
FIG. 21 is a schematic diagram showing the construction of a gate circuit used with the shift signal control circuit.

The construction and operation of the gate circuit 354 will be described by way of an example with reference to FIG. 21 in which numeral 359 designates a positive power supply terminal fed from the power unit 700. A Line 358 is connected to the L position terminal of the neutral safety switch 610. The emitter of a NPN-transistor 361 is connected to earth, the base is connected to the line 358 via a resistor 360' and to earth through a resistor 360, and the collector is connected to the line 359. The emitter of a NPN-transistor 363 is grounded, the base is connected to the collector of the NPN-transistor 361 and to earth through a resistor 362, and the collector is connected through a resistor 364' to the line 359 for the positive power supply. The emitter of a NPN-transistor 365 is connected to the output line 355 of the gate circuit 354 and to earth through a resistor 367, the base is connected to the collector of the NPN-transistor 361, and to the base of the NPN-transistor 363, and the collector is connected to the output line 331' of the comparator circuit 335'. The emitter of a NPN-transistor 336 is connected to the emitter of the transistor 365, the base is connected to the collector of the transistor 363, and the collector is connected to the output line 331'' of the comparator 355''. With the circuit arrangement described above, when the shift lever 601 is in the $D_1$ or $D_2$ position, no voltage is produced on the line 358 leading to the L position contacts so that there is not current supply to the base of the transistor 361 and it is cut off. In this state, a voltage appears at the collector of the transistor 361 and current is supplied to the bases of the transistors 363 and 365 so that the transistors 363 and 365 are turned on. With the transistor 363 now conducting, no current is supplied to the base of the transistor 366 and this cuts off the transistor 366 so that the output of the comparator circuit 335'' is disconnected from the output line 355 of the gate circuit 354. With the transistor 365 on, the output of the comparator circuit 355' is connected to the output line 355 of the gate circuit. Thus, in the $D_1$ or $D_2$ position of the shift lever, the transistors 363 and 365 conduct so that the output from the discrimination circuit 330' appears at the output of the gate circuit 354.

When the shift lever is moved to the L position, current flows through the line 358 and the transistor 361 conducts. This cuts off the transistors 363 and 365 and the transistor 366 conducts. Consequently, the output line 331' of the comparator circuit 335' is disconnected from the output line 355 of the gate circuit 354 and now the output line 331'' of the comparator circuit 335'' is connected with the line 355. In other words, when the shift lever is in the L position, the output from the discrimination circuit 330'' appears on the output line of the gate circuit 354. The output signal from the gate circuit 354 is amplified by the amplifier circuit 356 to actuate the solenoid 132.

It will be understood from the above that the shift point for the change from first to second or second to first speed is determined by the output from the discrimination circuit 330' when the shift lever 601 is in the $D_1$ or $D_2$ position, and when the shift lever 601 is in the L position this shift point is determined by the output from the discrimination circuit 330''.

SHIFT CONTROL OPERATION

The shift control operation in the L, $D_2$ and $D_1$ positions of the shift lever will be explained below.

In these positions, the circuit opening switch 620 is closed so that current is supplied to the power unit 700 and the shift signal control system is brought into action. The following table shows the relationship between the operating conditions of the solenoids described in the discussion of the hydraulic actuation circuit and the shift control system and the speed ratios (or gear positions) of the transmission.

TABLE 1

| $D_1$ position | | |
|---|---|---|
| Gear position | Solenoid 132 | Solenoid 137 |
| First gear | Energized | Energized |
| Second gear | Deenergized | Energized |
| Third gear | Deenergized | Deenergized |

TABLE 2

| L position | |
|---|---|
| Gear position | Solenoid 132 |
| First gear | Deenergized |
| Second gear | Energized |

The relationship in the $D_2$ position of the shift lever is the same as the $D_1$ position, but in the $D_2$ position no oil pressure is directed to the 2–3 shift valve 136 so that the third gear is not obtained.

1. 1–2 Shift control operation

Figure 19:
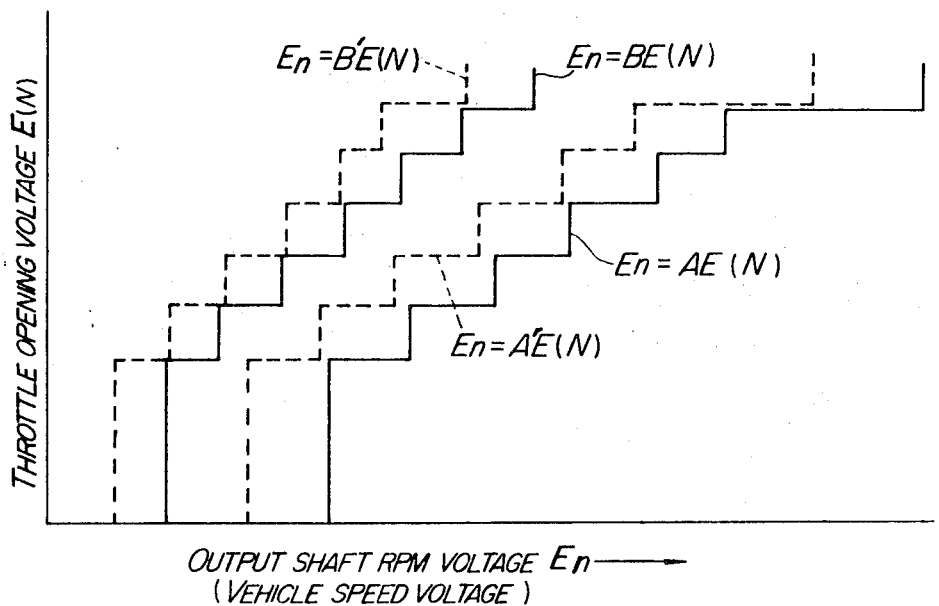
FIG. 19 is a graph showing, with the shift lever in the $D_1$ or $D_2$ position, the relationships between the output shaft r.p.m. signal and the throttle opening signal for explaining the shift ranges according to the present invention.
Figure 22:
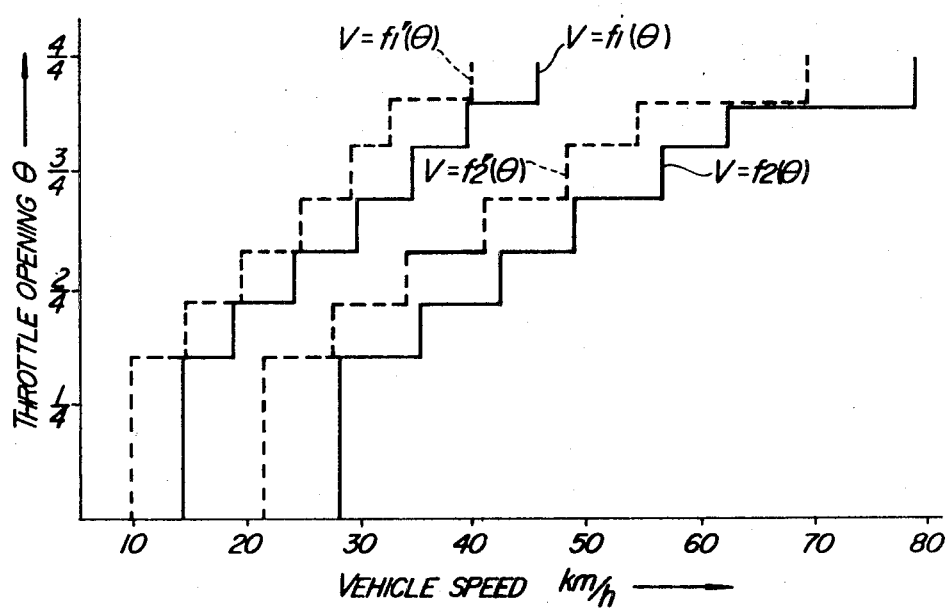
FIG. 22 is a graph showing an example of the shift ranges when the shift lever is in the $D_1$ or $D_2$ position.
Figure 23:
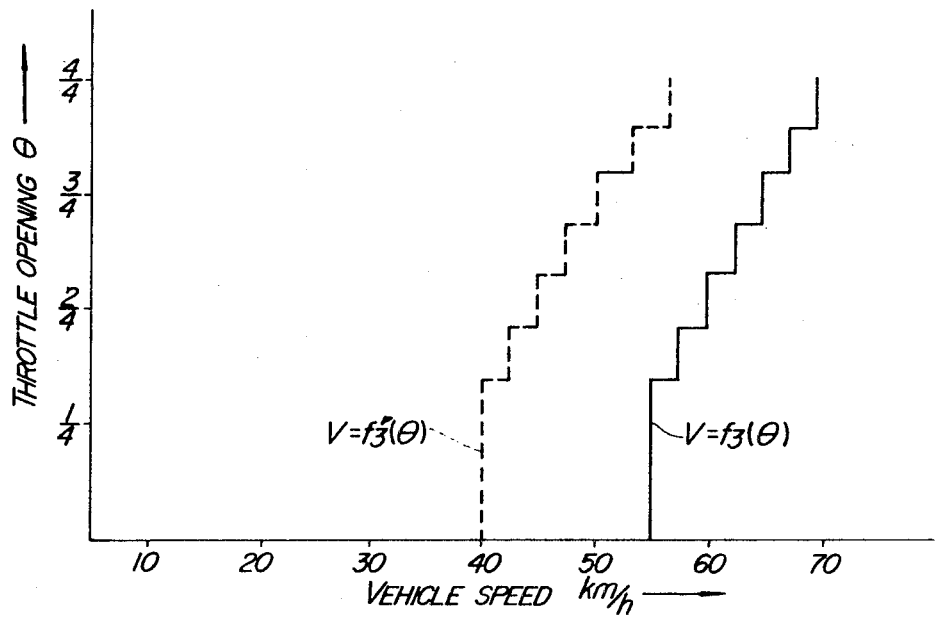
FIG. 23 is a graph showing an example of the shift ranges when the shift lever is in the L position.
Figure 24:
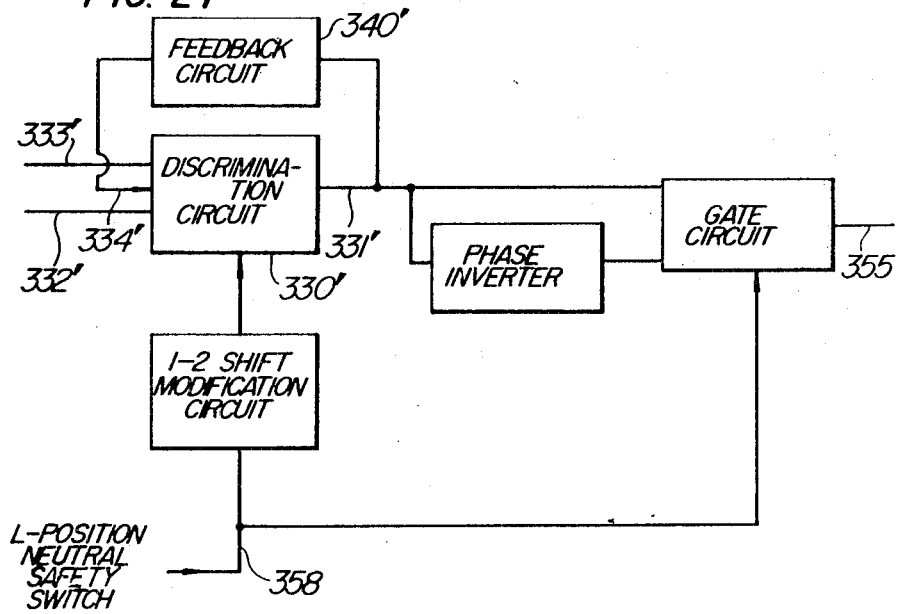
FIG. 24 is a block diagram showing the 1-2 shift control system with a single 1-2 shift discrimination circuit, which is used with the shift signal control system.

FIGS. 22 and 23 show the same relationships between the output shaft r.p.m. signal $E_n$ and the throttle opening signal $E(N)$ as shown in FIGS. 19 and 20, respectively, but in terms of the relations between the vehicle speed $V$ and the throttle opening $\theta$. In the $D_1$ and $D_2$ positions, the relation $E_n \geq BE(N)$ is attained when the driving condition of the vehicle is in the region (at the higher speeds) on the right-hand side of the curve $V=f_1(\theta)$ shown in FIG. 22, so that the output from the discrimination circuit 330' is zero (no voltage present) and the solenoid 132 is deenergized. The gear is thus changed from the first to the second gear. At the same time that the gear is changed to the second, there is no voltage applied to the feedback circuit 340'. This cuts off the NPN-transistor 341' and varies the voltage division of the output shaft r.p.m. signal $E_n$ by the variable resistor so that the discrimination circuit 330' now calculates $E_n \geq B'E(N)$. Thus, the shift from the second to first speed takes place on the curve $V=f_1(\theta)$ and the solenoid is energized on the left-hand side of the curve $V=f_1(\theta)$ to change the gear to the first gear. It has been a common practice with the ordinary automatic transmissions to provide different shift points for gear changes from first to second gear and from second to first gear in order to smooth out these shifts.

Next, the 1–2 shift control operation in the L position of the shift lever will be explained below. When the shift lever 601 is moved to the L position, a L position signal is applied to the gate circuit 354 so that the discrimination circuit 330'' controls the operation of the solenoid 132. Since the relation $E_n \geq CE(N)$ is obtained on the right-hand side of the curve $V=f_3(\theta)$ shown in FIG. 23, the discrimination circuit 330'' provides a one output (voltage present) and the solenoid 132 is energized to effect a shift from the first to second gear. At the same time that the second gear is obtained, a voltage is produced which is applied to the feedback circuit 340'' so that the NPN-transistor 340'' conducts to vary the voltage division of the throttle opening signal $E(N)$ and the discrimination circuit 330'' now calculates $E_n \geq C'E(N)$. Thus, the discrimination circuit 330'' provides a zero output on the left-hand side of the curve $V=f_3'(\theta)$ and the solenoid 132 is deenergized to change the gear ratio to first gear.

It will be apparent from the foregoing that the shift point in the L position is determined by the discrimination circuit 330'' so that the gear ratio is changed to the second gear when the solenoid 132 is energized and to the first gear upon deenergization of the solenoid. These operations are diametrically opposite to those which take place in the $D_2$ or $D_1$ position. Further, since this L position is used chiefly to provide braking by the engine, the shift points at the smaller throttle openings are preset so that they take place at the considerably higher engine speeds as compared with the cases in the $D_1$ or $D_2$ position.

2. 2–3 Shift control operation

The shift from the second to third gear takes place in the $D_1$ position. When the driving condition of the vehicle is in the region on the right-hand side of the curve $V=f_2(\theta)$ shown in FIG. 22, the relation $E_n \geq AE(N)$ is attained and the discrimination circuit 330 provides a zero output (zero voltage). This results in the change from the second to third gear.

With the zero signal on the output line 331 of the discrimination circuit 330, no voltage is applied to the feedback circuit 340 and the NPN-transistor 341 becomes nonconductive so that the discrimination circuit 330 now calculates at $E_n \geq AE(N)$. Thus, the downshift from the third to second gear occurs on the curve $V=f_2'(\theta)$ and the solenoid 137 is energized in the region on the left-hand side (at the lower speeds) of the curve $V=f_2'(\theta)$. This puts the transmission in second gear.

EMBODIMENT II

In the first embodiment described above in detail, the shift lever positions include the two series of different available positions, namely: P, R, N, $D_1$, $D_2$, L and 3, 2, 1. In the first series $D_1$, $D_2$ and L positions, the circuit opening switch 620 is closed to supply current to the shift signal control system and the automatic shift operations are thus effected. When in the 3, 2 and 1 positions in the other series, the circuit opening switch is opened to render the shift signal control system inoperative so that the transmission is changed from automatic to semiautomatic operation of the gears in which the shift lever is moved by the driver from the positions '1' to '2', '2' to '3' and vice versa. In the second embodiment which will be described hereinafter, six forward speed positions are also provided and different shift ranges are available for these six positions.

Similarly with the first embodiment, the shift position selection system and the shift signal control system incorporated in the present embodiment will now be described below.

SHIFT POSITION SELECTION SYSTEM

Figure 25:
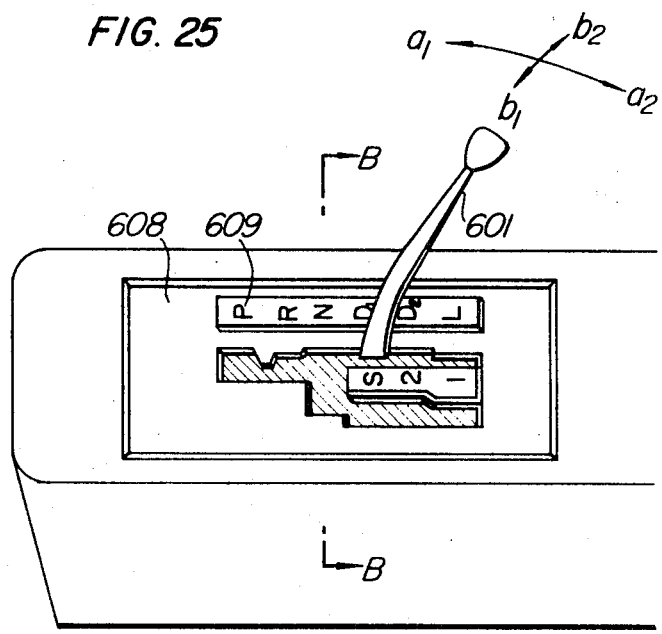
FIG. 25 is a perspective view showing a shift lever incorporated in another embodiment of the present invention.

FIG. 25 is a perspective view of the shift position selection system employed in the second embodiment, which is the same with that of the first embodiment shown in FIG. 11, excepting that the left column positions 3, 2 and 1 marked on an indicator scale $609_a$ are now replaced with the positions S, 2 and 1. The section taken through the line B—B of FIG. 25 will appear as shown in FIG. 12, but the wiring connection with the circuit opening switch 620 is different from the one in the first embodiment. Accordingly, this circuit opening switch 620 will be referred to as a sporty switch 609 in the present embodiment. When the shift lever 601 is in the left (or on the side of b1 or S, 2 and 1 positions in FIG. 25), the sporty switch 609 is closed and the setting value to be determined by the discrimination circuit is changed to move the shift point. The construction and operation of the shift position selection system 600, excepting the foregoing, are the same as in the case of the first embodiment. Thus, the shift lever 601 is linked to the manual valve 120 in the hydraulic actuation circuit and the L and 1 positions on the indicator scale $609_a$ correspond to the L position of the manual valve 120; the $D_2$ and 2 positions to the manual valve $D_2$ position; $D_1$ and S positions to the manual valve $D_1$ position; and N, R and P positions to the N, R and P positions of the manual valve 120.

SHIFT SIGNAL CONTROL SYSTEM

FIG. 26 is a block diagram showing the shift signal control system incorporated in the second embodiment. The circuit construction is the same with that of the first embodiment excepting the following circuits:

1. The sporty switch 609 is equipped in place of the circuit opening switch 620. Consequently, when the ignition switch (key switch) for starting the engine is closed, current is supplied directly from the source through a fuse to the neutral safety switch 610. When the shift lever 601 is in the forward speed positions (there are six such positions: $D_1$, $D_2$, L, S, 2 and 1), current is supplied to the power unit 700 which in turn supplies the various circuits so that these circuits are brought into action.

2. When the shift lever 601 is moved into the left slot of the gate (on the b1 side with the marked positions S, 2 and 1), the sporty switch 609 is closed to vary the shift point (or curve). For moving the shift point, a 1–2 shift modification circuit 360 for 1–2 or 2–1 gear changes and a 2–3 shift modification circuit 360' for 2–3 or 3–2 gear changes are additionally provided.

Figure 27:
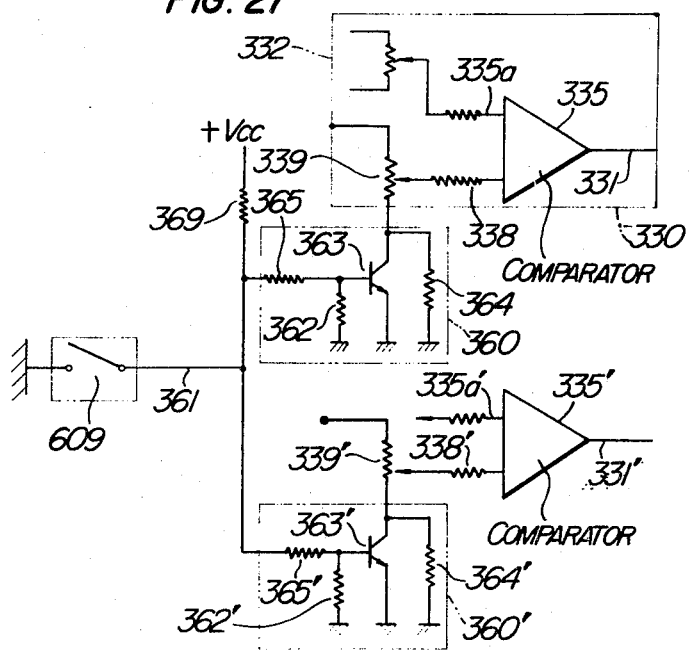
FIG. 27 is a schematic diagram showing a shift modification circuit used with the shift signal control system.

The shift modification circuits 360 and 360' are shown in FIG. 27 and their circuit constructions are identical. Thus, only the 1–2 shift modification circuit 360 will now be explained. The sporty switch 609 has one end connected to earth and the other end connected to the power supply $tVcc$. The emitter of a NPN-transistor 363 is grounded, the base is connected to earth through a resistor 362, and the sporty switch 609 and the power supply $tVcc$ are connected to the transistor base through a resistor 365. The collector of the transistor 363 is connected to one end of the fixed terminal of a variable resistor 339 in a discrimination circuit 330 and this junction point is connected to earth through a resistor 364. In operation, when the sporty switch 609 is opened, voltage is applied to the base of the transistor 363 through the resistor 365 and the transistor conducts thereby grounding one end of the variable resistor 339. On the other hand, when the sporty switch 609 is closed, there is no current flow through the resistor 365 so that the transistor 363 is cut off and the end of the variable resistor 339 is grounded through the resistor 364. Now assuming that the throttle opening voltage E(N) is applied to an input terminal 332 of the discrimination circuit 330 and the sporty switch 609 is opened, throttle opening voltage $E_a(N)$ across the movable terminal of the variable resistor 339 will be the same as in the case of the first embodiment, that is, the voltage $E_a(N)$ will be given as:

$$E_a(N) = \frac{R_c}{R_b + R_c},$$

where $R_b$ represents the resistance values of the movable terminal of the variable resistor 339 and the input terminal 332 and $R_c$ represents the resistance values of the said movable terminal and the earth. When the sporty switch is closed, voltage $E_b(N)$ across the said movable terminal will be given as:

$$E_b(N) = \frac{R_c + R_f}{R_b + R_c + R_f},$$

where $R_f$ represents the resistance value of the resistor 364. There is thus the relation $E_b(N) > E_a(N)$ for the same signal $E(N)$ so that the output from the comparator circuit is produced at higher vehicle speeds, that is, the shift takes place at higher vehicle speeds than when the sporty switch is opened.

It will be apparent from the foregoing that in the open position of the sporty switch 609 (in this case the shift lever 609 is in the $D_1$, $D_2$ or L position), the circuit construction is identical to the first embodiment. Thus, it is evident that gear changes take place according to the shift diagram shown in FIG. 22.

Figure 28:
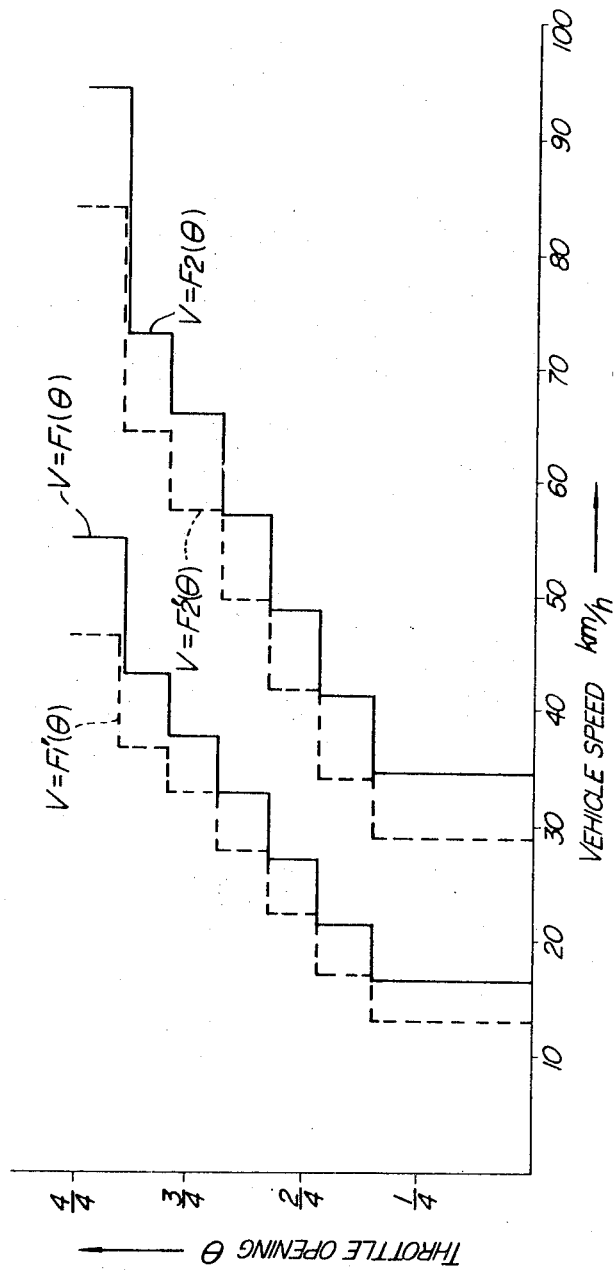
FIG. 28 is a graph showing an example of the shift ranges in another embodiment of the present invention when the shift lever is in the S position.

In the closed position of the sporty switch 609 (in this case the shift lever 601 is in the S, 2 or 1 position), the throttle voltage [$E_b(N)$] applied to the comparator circuit is high so that the operations on this voltage and the vehicle speed signals in the comparator circuit, that is, $E_{an}-E_a(N)$ (upshift) and $E_{bn}-E_{ba}(N)$ (downshift) result in that the output signals from the comparator circuit are caused to vary at higher vehicle speeds than when the sporty switch is opened. Thus, the shift curve is now moved to a higher side of the vehicle speed than in FIG. 22. FIG. 28 is a shift diagram with the sporty switch in the closed position and in this figure the curve $V = F_1(\theta)$ shows the upshift curve from the first to second gear and the curve $V = F_1'(\theta)$ shows the downshift curve from the second to first gear. It will be seen from the figure that the curves $V = F_2(\theta)$ and $V = F_2'(\theta)$ are moved to the higher side of the vehicle speeds than the 2-3 upshift and downshift curves shown in FIG. 22.

It should be understood that while the present invention incorporates the 1-2 and 2-3 shift modification circuits to merely vary the shift points in the $D_1$ and $D_2$ positions of the shift lever 601 only for purposes of clarity, a similar shift modification circuit may be added to the discrimination circuit 330" for the L position so as to vary the shift point in the L position through the operation of the sporty switch 609. It should also be apparent that while the shift point varying means of the present invention is provided by the shift modification circuits connected to the throttle voltage circuit, the shift modification circuits may be connected to the vehicle speed voltage circuit to vary the vehicle speed voltage. Various alternative methods may be conceived in which one or the other, or both of the signals are modified to vary the shift curve.

The present invention has been described in detail with reference to the two embodiments, and now the features and the effects of the present invention may be summarized as follows:

1. For the forward speed positions, the shift lever works in a slotted gate marked with two series of operating positions so that it may select any one of the six forward speed positions. Then, different gear change ranges are provided for all of the six forward speed positions. This enables the driver to select the proper position that suits the prevailing driving conditions, thus permitting the vehicle to be driven at the proper gear ratio.

2. The actuation of the sporty switch or the circuit opening switch is linked with the operation of the shift lever so as to vary the shift curve. Thus, the shift point varying operation can be effected very simply and without any difficulty as compared with the conventional methods using separate switches for this purpose.

3. The transmission system according to the first embodiment of the present invention is a fully automatic system and at the same time a semiautomatic one in that it combines the features of both systems in one unit. For example, since the semiautomatic shifts take place in the open position of the circuit opening switch and the shift signal control system is thus rendered inoperative, the gear shifts are effected according to the movement of the manual valve in the hydraulic actuation circuit only. Consequently, even in case of any failure in the electrical system, driving is still possible without any difficulty and at the same time since the shift valve means are inoperative, the causes of the trouble will be reduced greatly. Moreover, the driver is provided with the facility to enjoy both the choice of gear changing operations and ease of driving.

4. In the second embodiment of the present invention, the shift point in the automatic gear change positions D and S are preset such that the shift point in the D position is set for normal driving with an extended high gear range and a limited low gear range. This permits driving at economical speeds, and it also permits quiet driving when use is made of this shift point at the lower engine speeds. On the other hand, the shift point in the S position provides an extended low gear range and thus it is well suited for sporty driving as well as for driving under hilly conditions. Thus, any desired automatic shift positions may be determined according to the driver's preference.

5. Since the automatic shift control is effected electronically, it is simple and easy to vary the determination of the shift point in a variety of ways as previously explained in contrast to the conventional hydraulic control of the gear changing operations.

It should be understood that while the embodiments of the present invention have been explained with reference to the automatic transmission having the three forward speeds and one reverse speed, any person having fully understood the technical disclosure of the present invention may effect many changes and modifications without departing from the spirit of the present invention defined by the attached claims. This is evident from the abundant technical matter disclosed by the inventors.

We claim:

1. In a shift control system for a vehicle automatic transmission which includes a transmission gear assembly and engaging means for effecting gear changing engagements of said transmission gear assembly, and a shifting means for operating said engaging means, the improvement comprising signal generator means for producing electrical signals representative of the driving conditions of the vehicle, circuit means for acting upon the signals from said signal generator means to establish a shift condition for actuating said shifting means, shift condition modification means for varying said shift condition, and a shift lever having plural series of gear shifting positions for actuating said shifting means, and means associated with said shift lever for operating said shift modification means to vary said shift condition when said shift lever is transferred from one to the other of said plural series of gear shifting positions.

2. In a shift control system for a vehicle transmission which includes a transmission gear assembly and engaging means for effecting gear changing engagments of said transmission gear assembly, and shifting means for operating said engaging means, the improvement comprising signal generator means for producing electrical signals representative of the driving conditions of the vehicle, circuit means to determine a shift condition for actuating said shifting means, a first electrical circuit for receiving the output signal from said shift condition-establishing circuit to effect an automatic shifting action, a switching circuit adapted to cut off the output signal from said shift condition establishing circuit to effect a semiautomatic shifting action, and shift lever means having two series of gear shifting positions for actuating said shifting means, wherein one of said two series of gear shifting positions is associated with said first electrical circuit and the other of said two series is associated with said switching circuit, whereby selection of the gear shifting columns of said, shift lever means changes the shift condition for an automatic shifting action or semiautomatic shifting action.

3. In a shift control system for a vehicle automatic transmission which includes a transmission gear assembly and engaging means for effecting gear shifting engagements of said transmission gear assembly, and shifting means for operating said engaging means, the improvement comprising signal generator means for producing electrical signals representative of the driving conditions of the vehicle, circuit means for operating on the signals from said signal generator means to establish a shift condition for actuating said shifting actuation means, a shift point modification circuit, switching means for selectively connecting said shift point modification circuit to said establishing circuit to modify the shift point when said switching means is in a closed position and shift lever means having two series of gear shifting positions for actuating said shifting actuation means, wherein one of said two series of gear shifting positions opens said switching, and the other series closes said switching means, whereby selection of the gear shifting columns of said shift lever changes the shift point for the automatic transmission.

4. In a shift control system for a vehicle transmission which includes a transmission gear assembly, engaging means for effecting gear shifting engagement of said transmission gear assembly, and shifting means for operating said engaging means, the improvement comprising, a shift lever having plural series of gear shifting positions for actuating said shifting means, signal generator means for producing electrical signals representative of the operating conditions of the vehicle, a circuit connected to the output of said signal generator means for acting upon the output signals therefrom to establish a shift condition and an electrical operator connected to the output of said establishing circuit for actuating said shifting means in conjunction with said shift lever, a shift condition modification circuit connected to said establishing circuit for varying said shift conditions, and means associated with said shift lever for operating said shift condition modification circuit when said shift lever is in one of said plural series.

5. The shift control system of claim 4 wherein said signal generating means comprises a toothed disc of magnetic material securely mounted coaxially on the output shaft of said vehicle transmission and a coil located adjacent to the outer periphery of said toothed disc the axis of said coil being located on a line radial to said disc whereby a voltage having a frequency proportional to the rotational speed of said output shaft is induced in said coil.

6. The shift control system of claim 5 further including a digital to analog converter electrically connected between said coil and said establishing circuit.

7. The shift control system of claim 4 wherein said signal generating means comprises a movable contact mechanically connected with the carburetor throttle of said vehicle, a plurality of fixed contacts arranged to engage with said movable contact, each of said fixed contacts being connected through a separate resistance to a source of electrical power, and a voltage tap line connected in common between said resistances and said power source wherein the movement of said carburetor throttle causes said movable contact to engage a varying number of fixed contacts and thus to vary the output voltage on said voltage tap line proportional to the setting of said carburetor throttle.

8. The shift control system of claim 4 wherein said signal generating means comprises a toothed disc of magnetic material securely mounted coaxially on the output shaft of said vehicle transmission and a coil located adjacent to the outer periphery of said toothed disc the axis of said coil being located on a line radial to said disc whereby a voltage having a frequency proportional to the rotational speed of said output shaft is induced in said coil, and a movable contact mechanically connected with the carburetor throttle of said vehicle, a plurality of fixed contacts arranged to engage with said movable contact each of said fixed contacts connected through a separate resistance to a source of electrical power and a voltage line connected in common between said resistances and said power source wherein the movement of the carburetor throttle causes said movable contact to engage a varying number of said contact and thus to vary the output voltage of said voltage tap line proportional to the carburetor throttle setting.

9. The shift control system of claim 4 wherein said shifting means comprises a source of pressurized liquid and a hydraulic system having at least one valve for controlling the flow of liquid within said hydraulic system and at least one hydraulic operator in liquid connection with said hydraulic system and in mechanical connection with said engaging means for operating said engaging means.

10. The shift control system of claim 9 wherein said engaging means comprises at least one clutch and said hydraulic operator comprises a servo chamber mechanically adapted to cause the engagement of said clutch.

11. The shift control system of claim 9 wherein said engaging means comprises at least one brake band and said hydraulic operator comprises a servo chamber mechanically adapted to cause the engagement of said brake band.

12. The shift control system of claim 4 wherein said signal generating means produces two signals and said establishing circuit comprises a comparator having first and second input leads and an output lead, one of said two signals being applied to said first input lead and the other of said two signals being applied to said first input lead, said comparator producing an output on said output lead only when said first signal exceeds said second signal.

13. The shift control system of claim 12 further including a feedback circuit connected between said output lead of said comparator and said first input lead thereof for adding a portion of the output signal produced by said comparator to the input signal at said first input lead whereby signals on said output lead are stabilized.

14. The shift control system of claim 12 wherein said shift modification means comprises a second comparator which is electrically identical to the first comparator and has electrically identical input and output leads but differs from said first comparator in that said second signal is applied to the first input lead of said second comparator and said first signal is applied to the second input lead of said second comparator whereby said second comparator produces an output only when second signal exceeds said first signal, and an electrical gate to which gate the output leads of said first and second comparators are connected as inputs and from which gate an output lead extends which is connected to said electrical operator.

15. The shift control system of claim 14 wherein said means associated with said shift lever for operating said shift modification means comprises a third input lead to said gate which operates said gate to connect the output of either said first or said second comparator to said electric operator.

16. The shift control system of claim 15 further including a source of electric power and a switch associated with said shift lever both connected on said third input lead whereby said source of electrical power can be connected to or disconnected from said third input lead.

17. The shift control system of claim 12 wherein said shift condition modification circuit comprises a voltage divider means for presenting one of said signals to said second input lead and switch means for changing the voltage divider proportion whereby the input to said second input lead is varied.

* * * * *